(12) United States Patent
Nishigaki et al.

(10) Patent No.: US 10,440,314 B2
(45) Date of Patent: Oct. 8, 2019

(54) VIDEO SIGNAL CONVERSION DEVICE, VIDEO SIGNAL CONVERSION METHOD, VIDEO SIGNAL CONVERSION SYSTEM, CONTROL PROGRAM, AND RECORDING MEDIUM

(71) Applicant: SHARP KABUSHIKI KAISHA, Sakai, Osaka (JP)

(72) Inventors: Tomoo Nishigaki, Sakai (JP); Hideki Suzuki, Sakai (JP); Toshiyuki Fujine, Sakai (JP); Kazuyoshi Yoshiyama, Sakai (JP); Ryoji Sakurai, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/079,483

(22) PCT Filed: Jun. 22, 2017

(86) PCT No.: PCT/JP2017/023093
§ 371 (c)(1),
(2) Date: Aug. 23, 2018

(87) PCT Pub. No.: WO2018/012244
PCT Pub. Date: Jan. 18, 2018

(65) Prior Publication Data
US 2019/0052837 A1    Feb. 14, 2019

(30) Foreign Application Priority Data
Jul. 11, 2016    (JP) .................. 2016-137107

(51) Int. Cl.
H04N 7/01        (2006.01)
H04N 21/435    (2011.01)
(Continued)

(52) U.S. Cl.
CPC .............. H04N 7/01 (2013.01); H04N 7/025 (2013.01); H04N 7/08 (2013.01); H04N 21/235 (2013.01);
(Continued)

(58) Field of Classification Search
CPC .. H04N 7/01; H04N 5/20; H04N 5/57; H04N 7/025; H04N 7/08; H04N 21/2343;
(Continued)

(56) References Cited

U.S. PATENT DOCUMENTS

| 5,768,442 A * | 6/1998 | Ahn ........................ G06T 5/009 348/E5.073 |
| 2013/0176498 A1* | 7/2013 | Noutoshi ................. H04N 9/68 348/712 |
| 2016/0292834 A1 | 10/2016 | Tsuru et al. |

FOREIGN PATENT DOCUMENTS

JP        2016-058848 A        4/2016

* cited by examiner

*Primary Examiner* — Sherrie Hsia
(74) *Attorney, Agent, or Firm* — ScienBiziP, P.C.

(57) ABSTRACT

A video signal conversion device is realized in which even in a case where an HDR video signal following a first video format is converted into a HDR video signal following a second video format, supplementary information related to the HDR video signal following the original first video format is not lost. The video signal conversion device (1 or 40) includes: a conversion unit (5) that converts the high dynamic range video signal following the first video format into the high dynamic range video signal following the second video format; and an output unit (12) that outputs the supplementary information which is related to the high dynamic range video signal following the first video format.

19 Claims, 15 Drawing Sheets

(51) Int. Cl.
*H04N 21/4402* (2011.01)
*H04N 7/025* (2006.01)
*H04N 7/08* (2006.01)
*H04N 21/2343* (2011.01)
*H04N 21/235* (2011.01)
*H04N 5/20* (2006.01)
*H04N 5/57* (2006.01)

(52) U.S. Cl.
CPC ... *H04N 21/2343* (2013.01); *H04N 21/23439* (2013.01); *H04N 21/435* (2013.01); *H04N 21/4402* (2013.01); *H04N 21/44029* (2013.01); *H04N 5/20* (2013.01); *H04N 5/57* (2013.01)

(58) Field of Classification Search
CPC .......... H04N 21/23439; H04N 21/235; H04N 21/435; H04N 21/4402; H04N 21/44029; H04N 11/20
USPC ........ 348/441, 445, 446, 448, 453, 458, 459
See application file for complete search history.

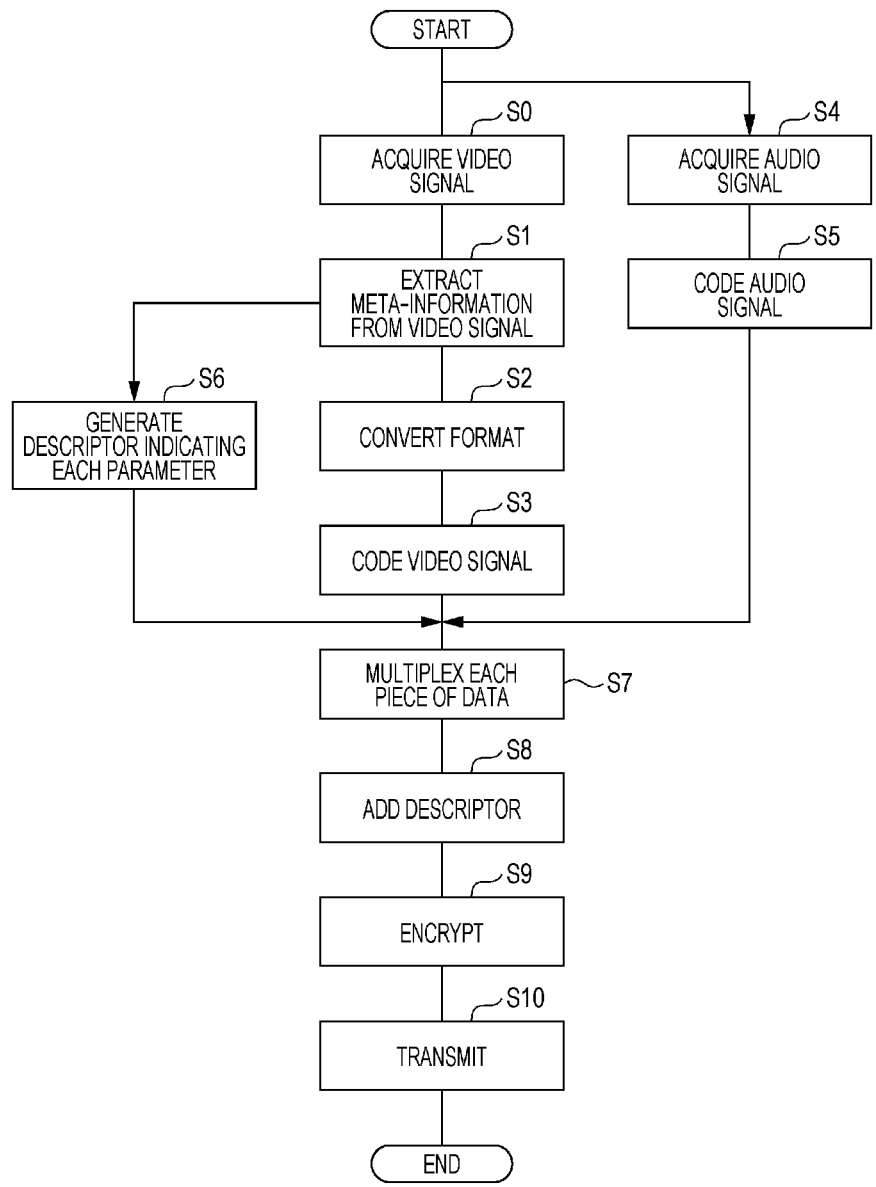

| | |
|---|---|
| table_id | 8 |
| section_syntax_indicator | 1 |
| '0' | 1 |
| reserved | 2 |
| section_length | 12 |
| service_id | 16 |
| reserved | 2 |
| version_number | 5 |
| current_next_indicator | 1 |
| section_number | 8 |
| last_section_number | 8 |
| transport_stream_id | 16 |
| original_network_id | 16 |
| segment_last_section_number | 8 |
| last_table_id | 8 |
| for (i=0;i<N;i++) { | |
|    event_id | 16 |
|    start_time | 40 |
|    duration | 24 |
|    running_status | 3 |
|    free_CA_mode | 1 |
|    descriptors_loop_length | 12 |
| D1 →    for (j = 0;j< M;j++) { | |
|       descriptor() | |
|    } | |
| } | |
| CRC_32 | |

(b)

| | |
|---|---|
| descriptor_tag | 0x4E |
| descriptor_length | |
| descriptor_number | |
| last_descriptor_number | |
| : | |
| : | |
| : | |
| text_length | |
| Text_char | *** |

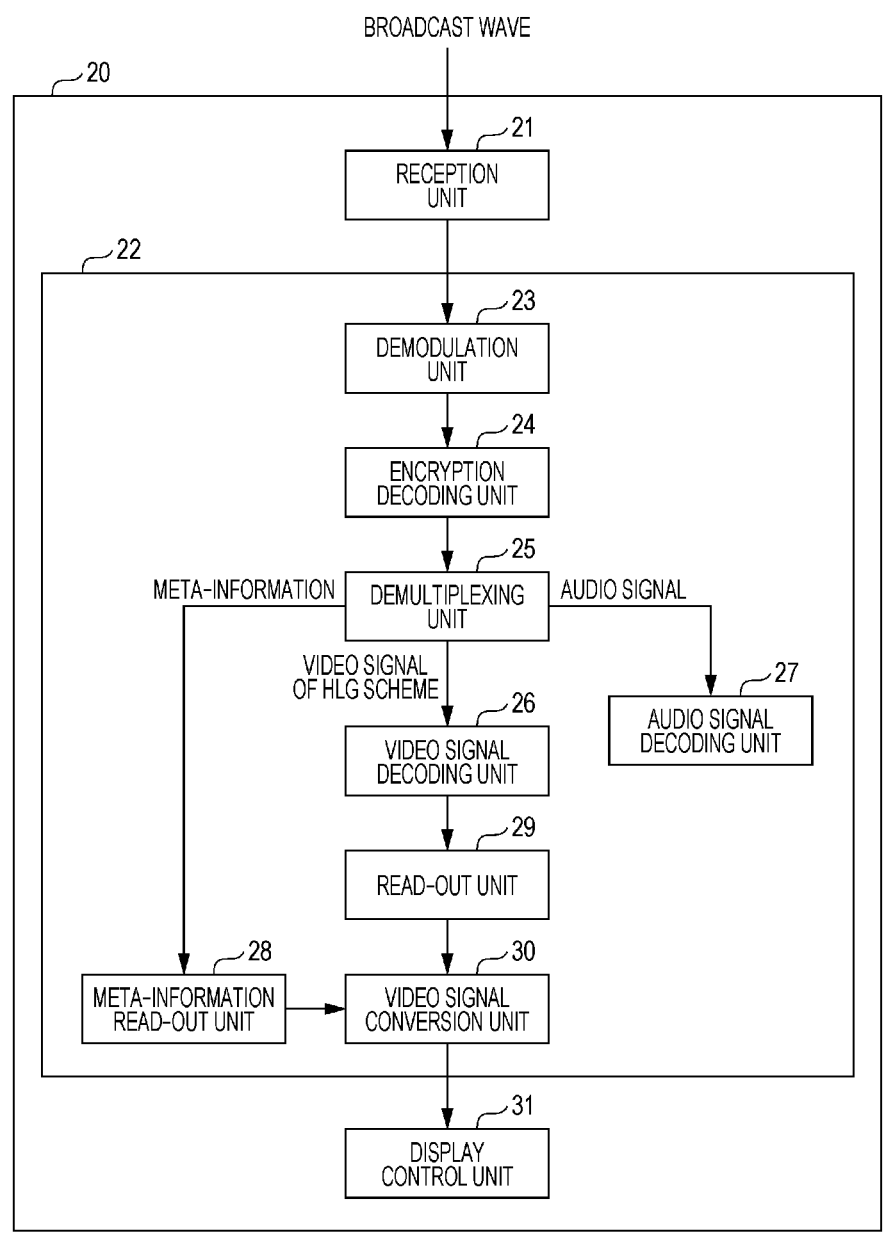

FIG. 8

| Data Byte NUMBER | CONTENTS | GROUP |
|---|---|---|
| Data Byte 3 | display_primaries_x[0], LSB | 1 |
| Data Byte 4 | display_primaries_x[0], MSB | |
| Data Byte 5 | display_primaries_y[0], LSB | |
| Data Byte 6 | display_primaries_y[0], MSB | |
| Data Byte 7 | display_primaries_x[1], LSB | |
| Data Byte 8 | display_primaries_x[1], MSB | |
| Data Byte 9 | display_primaries_y[1], LSB | |
| Data Byte 10 | display_primaries_y[1], MSB | |
| Data Byte 11 | display_primaries_x[2], LSB | |
| Data Byte 12 | display_primaries_x[2], MSB | |
| Data Byte 13 | display_primaries_y[2], LSB | |
| Data Byte 14 | display_primaries_y[2], MSB | |
| Data Byte 15 | white_point_x, LSB | 2 |
| Data Byte 16 | white_point_x, MSB | |
| Data Byte 17 | white_point_y, LSB | |
| Data Byte 18 | white_point_y, MSB | |
| Data Byte 19 | max_display_mastering_luminance, LSB | 3 |
| Data Byte 20 | max_display_mastering_luminance, MSB | |
| Data Byte 21 | min_display_mastering_luminance, LSB | 4 |
| Data Byte 22 | min_display_mastering_luminance, MSB | |
| Data Byte 23 | Maximum Content Light Level, LSB | 5 |
| Data Byte 24 | Maximum Content Light Level, MSB | |
| Data Byte 25 | Maximum Frame-average Light Level, LSB | 6 |
| Data Byte 26 | Maximum Frame-average Light Level, MSB | |

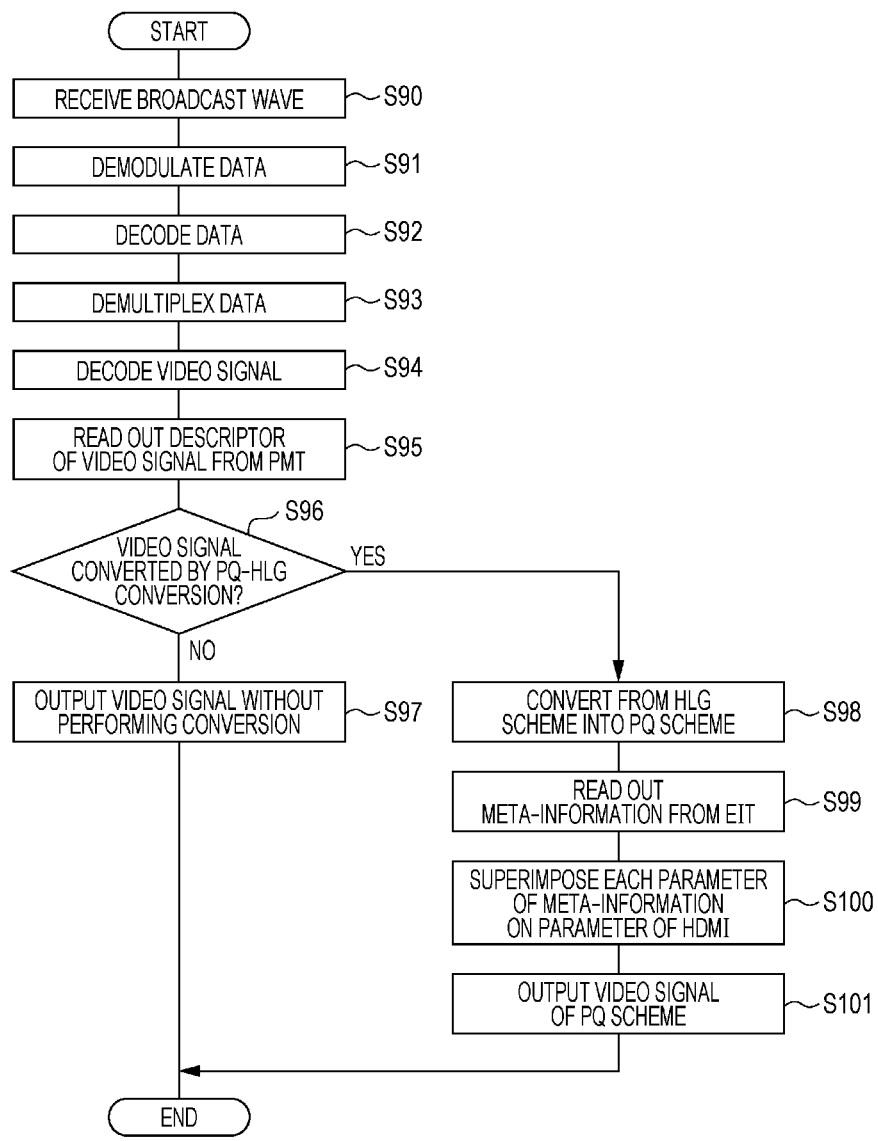

VIDEO SIGNAL CONVERSION DEVICE, VIDEO SIGNAL CONVERSION METHOD, VIDEO SIGNAL CONVERSION SYSTEM, CONTROL PROGRAM, AND RECORDING MEDIUM

TECHNICAL FIELD

The present invention relates mainly to a video signal conversion device that converts a video signal following a first video format into a video signal following a second video format.

BACKGROUND ART

In recent years, TVs have become popular which support high dynamic range video signals (hereinafter, HDR video signal). In HDR standards, there are plural standards that include an absolute luminance scheme (including a PQ scheme or the like) and a relative luminance scheme (including an HLG scheme or the like) as a luminance scheme.

As a literature that discloses techniques related to the HDR video signal, for example, PTL 1 is raised. PTL 1 discloses an image processing device that may transmit and receive or display a high dynamic range image. The image processing device transfers luminance conversion information for converting HDR contents into SDR contents or differential information as metadata of contents.

CITATION LIST

Patent Literature

PTL 1: Japanese Unexamined Patent Application Publication No. 2016-58848 (laid open on Apr. 21, 2016)

SUMMARY OF INVENTION

Technical Problem

As described above, as HDR standards, plural standards are present. Further, in conversion among those standards, techniques for performing conversion while maintaining the image quality are requested. For example, in a case where an HDR video signal following an absolute luminance scheme (hereinafter, PQ scheme) is converted into an HDR video signal following a relative luminance scheme (hereinafter, HLG scheme), supplementary information related to the HDR video signal following the original PQ scheme (for example, meta-information such as an absolute luminance value) is lost. Further, in a case where the HDR video signal following the HLG scheme, which is converted from the HDR video signal following the PQ scheme, is converted into the HDR video signal following the original PQ scheme on a receiver side, it is difficult to maintain the image quality of the HDR video signal following the original PQ scheme.

The present invention has been made in consideration of the above problems, and an object thereof is to realize a video signal conversion device in which supplementary information related to an HDR video signal following an original first video format is not lost even in a case where the HDR video signal following the first video format is converted into an HDR video signal following a second video format. Further, an object thereof is to realize a video signal conversion device that may maintain image quality of the HDR video signal following the original first video format even in a case where the HDR video signal following the second video format, which is converted by such a video signal conversion device, is converted into the HDR video signal following the original first video format.

Solution to Problem

To solve the above problems, a video signal conversion device according to one aspect of the present invention includes: a conversion unit that converts a high dynamic range video signal following a first video format into a high dynamic range video signal following a second video format; and an output unit that outputs supplementary information which is related to the high dynamic range video signal following the first video format.

Further, a video signal conversion device according to one aspect of the present invention includes: an acquisition unit that acquires supplementary information which is related to a high dynamic range video signal following a first video format; and a conversion unit that converts a high dynamic range video signal following a second video format, which is converted from the high dynamic range video signal following the first video format, into the high dynamic range video signal following the first video format by referring to the supplementary information.

Further, a video signal conversion method according to one aspect of the present invention includes: a conversion process of converting a high dynamic range video signal following a first video format into a high dynamic range video signal following a second video format; and an outputting process of outputting supplementary information that is related to the high dynamic range video signal following the first video format.

Further, a video signal conversion method according to one aspect of the present invention includes: an acquisition process of acquiring supplementary information which is related to a high dynamic range video signal following a first video format; and a conversion process of converting a high dynamic range video signal following a second video format, which is converted from the high dynamic range video signal following the first video format, into the high dynamic range video signal following the first video format by referring to the supplementary information.

Further, a video signal conversion system according to one aspect of the present invention includes: a first video signal conversion device including a conversion unit that converts a high dynamic range video signal following a first video format into a high dynamic range video signal following a second video format, and an output unit that outputs supplementary information which is related to the high dynamic range video signal following the first video format; and a second video signal conversion device including an acquisition unit that acquires the supplementary information, which is related to the high dynamic range video signal following the first video format, from the first video signal conversion device, and a conversion unit that converts the high dynamic range video signal following the second video format, which is converted by the first video signal conversion device, into the high dynamic range video signal following the first video format by referring to the supplementary information.

Advantageous Effects of Invention

A video signal conversion device according to one aspect of the present invention provides an effect in which supplementary information related to an HDR video signal following an original first video format is not lost even in a case where the HDR video signal following the first video format is converted into an HDR video signal following a second video format.

A video signal conversion device according to one aspect of the present invention provides an effect in which image quality of the HDR video signal following the original first video format may be maintained even in a case where the HDR video signal following the second video format, which is converted from the HDR video signal following the first video format, is converted into the HDR video signal following the original first video format.

BRIEF DESCRIPTION OF DRAWINGS

FIG. 3 is a flowchart that explains a video signal conversion method of the video signal conversion device 1 according to the first embodiment of the present invention.

FIG. 4(a) is a diagram that illustrates one example of an MH-EIT. FIG. 4(b) is a diagram that illustrates another example of the MH-EIT.

FIG. 5 is a block diagram that illustrates a configuration of a video signal conversion device 20 according to the first embodiment of the present invention.

FIG. 8 is a table that illustrates descriptors which are provided by CEA 861.3.

FIG. 9 is a flowchart that explains a video signal conversion method of the video signal conversion device 20 according to a modification example 2 of the first embodiment of the present invention.

DESCRIPTION OF EMBODIMENTS

Embodiments of the present invention will hereinafter be described in detail. However, the configurations described in those embodiments are not intended to limit the scope of the present invention thereto only but are merely explaining examples unless specific descriptions are made.

Figure 1:
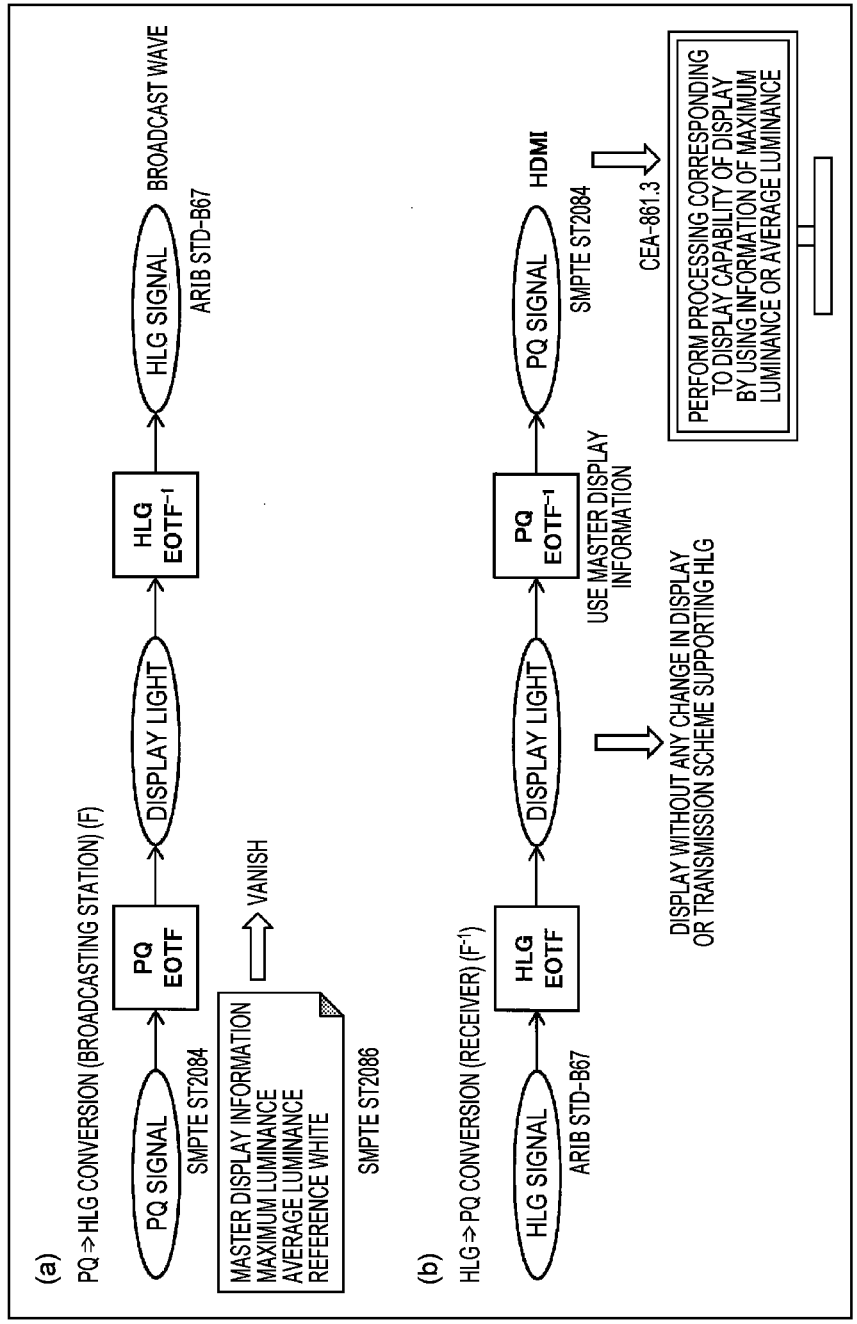
FIG. 1 is a diagram for explaining an outline of a video signal conversion device system of the present invention.

First, an outline of a video signal conversion device system according to each of the embodiments of the present invention will be described with reference to FIG. 1. FIG. 1 is a diagram for explaining the outline of the video signal conversion device system according to each of the embodiments of the present invention. FIG. 1(a) is a diagram for explaining conversion of a video signal in a broadcasting station (transmitter), and FIG. 1(b) is a diagram for explaining conversion of the video signal in a receiver.

As illustrated in FIG. 1(a), in the broadcasting station, an HDR video signal whose luminance scheme is a PQ scheme (for example, a video signal following a video format of SMPTE ST 2084) has pieces of meta-information such as master display information, maximum luminance, average luminance, and reference white, which are supplementary information related to the HDR video signal (for example, meta-information provided by SMPTE ST 2086). Further, the above-described supplementary information is lost in a procedure in which the HDR video signal is converted into display light information by an EOTF of the PQ scheme and the display light information is inversely converted into an HDR video signal of an HLG scheme by an $EOTF^{-1}$ of the HLG scheme.

Accordingly, in the video signal conversion device system of the present invention, the supplementary information related to the HDR video signal whose luminance scheme is the PQ scheme is transmitted to the receiver. As illustrated in FIG. 1(b), in the receiver, the HDR video signal whose luminance scheme is the HLG scheme is converted into the display light information by the EOTF of the HLG scheme, and the display light information is inversely converted into the HDR video signal of the PQ scheme by the $EOTF^{-1}$ of the PQ scheme. Further, in the video signal conversion device system according to the present invention, the above-described supplementary information transmitted from the broadcasting station side is output to a display device together with the HDR video signal of the PQ scheme in a form of a descriptor or the like that is provided by CEA 861.3, for example.

Note that "supplementary information" related to the HDR video signal following a first video format herein includes "meta-information" related to the HDR video signal following the first video format. More specifically, "meta-information" includes at least one of a maximum luminance value, a minimum luminance value, an average luminance value, a white level, and information related to a master monitor in a high dynamic range video signal following the first video format. Further, in the following embodiments, a description will be made about an example of a case where "supplementary information" is "meta-information".

[First Embodiment]

The video signal conversion system according to this embodiment will be described in detail. The video signal conversion system according to this embodiment includes a video signal conversion device 1 and a video signal conversion device 20, which will be described below. In the following, the video signal conversion device 1 and the video signal conversion device 20 will be described in detail.

(Video Signal Conversion Device 1)

Figure 2:
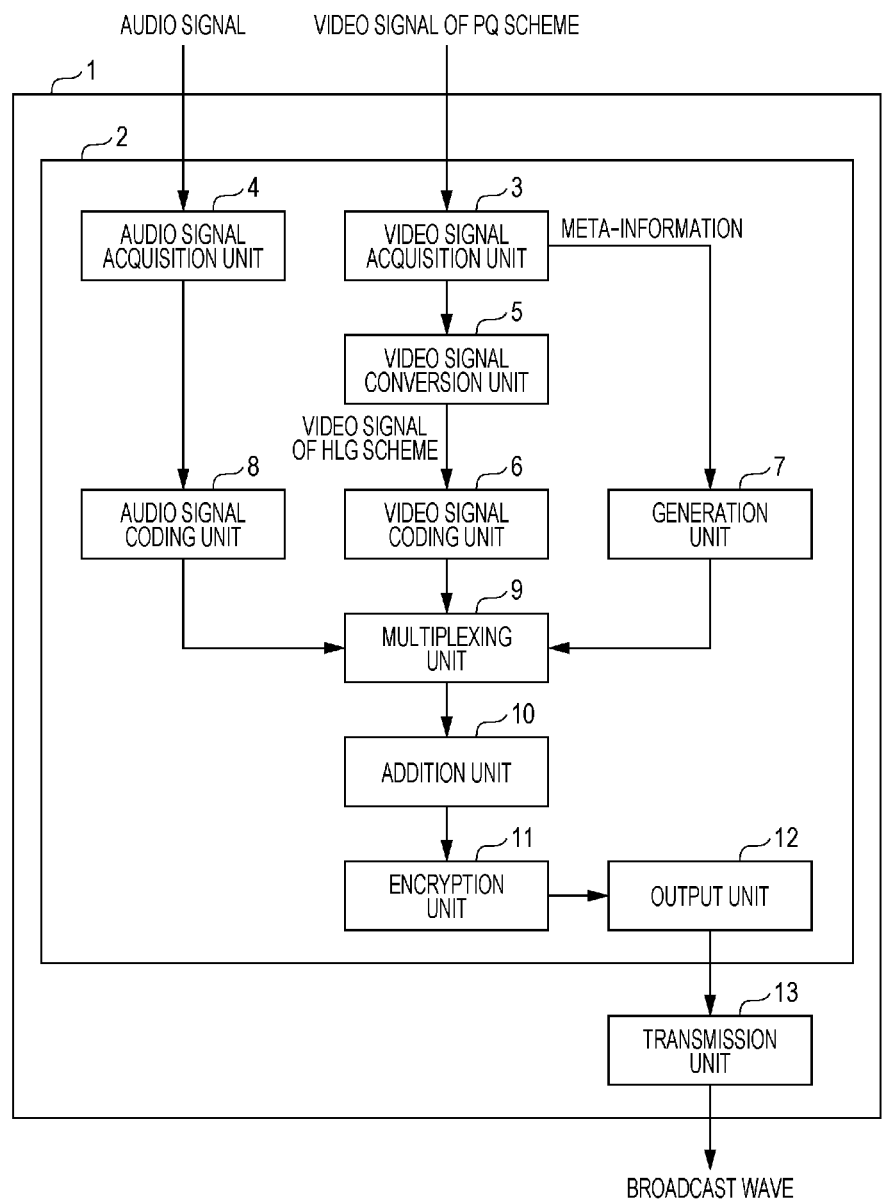
FIG. 2 is a block diagram that illustrates a configuration of a video signal conversion device 1 according to a first embodiment of the present invention.

The video signal conversion device 1 according to a first embodiment of the present invention will be described with reference to FIG. 2. FIG. 2 is a block diagram that illustrates a configuration of the video signal conversion device 1 according to this embodiment. As illustrated in FIG. 2, the video signal conversion device 1 includes a processing unit 2 and a transmission unit 13. In such a manner, the video signal conversion device 1 includes the transmission unit 13 and may thus be referred to as transmission device.

The processing unit 2 includes a video signal acquisition unit 3, an audio signal acquisition unit 4, a video signal conversion unit 5, a video signal coding unit 6, a generation unit 7, an audio signal coding unit 8, a multiplexing unit 9, an addition unit 10, and an encryption unit 11.

The video signal acquisition unit 3 acquires the HDR video signal following a video format whose luminance scheme is the PQ scheme (hereinafter, first video format) and extracts meta-information from the HDR video signal following the first video format.

The audio signal acquisition unit 4 acquires an audio signal that corresponds to the HDR video signal following the first video format, which is acquired by the video signal acquisition unit 3.

The video signal conversion unit 5 converts the HDR video signal following the first video format, which is acquired by the video signal acquisition unit 3, into the HDR video signal following a video format whose luminance scheme is the HLG scheme (hereinafter, second video format).

The video signal coding unit 6 codes the HDR video signal following the second video format, which is converted by the video signal conversion unit 5.

The generation unit 7 generates the descriptor that indicates a parameter of each piece of meta-information from the meta-information extracted by the video signal acquisition unit 3.

The audio signal coding unit 8 codes an audio signal acquired by the audio signal acquisition unit 4.

The multiplexing unit 9 multiplexes the HDR video signal following the second video format, which is coded by the video signal coding unit 6, the descriptor, which is generated by the generation unit 7 and indicates the parameter of each of the pieces of meta-information, and the audio signal, which is coded by the audio signal coding unit 8, with data in an MPEG media transport (MMT) format.

The addition unit 10 adds the descriptor, which indicates that the HDR video signal following the first video format is converted into the HDR video signal following the second video format, as the supplementary information to the data in the MMT format, which are multiplexed by the multiplexing unit 9.

The encryption unit 11 encrypts the data in the MMT format to which the descriptor is added by the addition unit 10.

An output unit 12 outputs the data in the MMT format, which are encrypted by the encryption unit 11, (encrypted MMT format data) to the transmission unit 13.

The transmission unit 13 transmits the encrypted MMT format data, which are output by the output unit 12, as a broadcast wave.

(Action of Video Signal Conversion Device 1)

A video signal conversion method executed by the video signal conversion device 1 according to this embodiment will be described with reference to FIG. 2. FIG. 3 is a flowchart that illustrates the video signal conversion method executed by the video signal conversion device 1 according to this embodiment.

First, the video signal acquisition unit 3 acquires the HDR video signal following the first video format (step S0). Here, in this embodiment, the first video format is a video format whose luminance scheme is the PQ scheme, and the second video format, which will be described later, is a video format whose luminance scheme is the HLG scheme. As an example of the first video format, SMPTE ST 2084 may be raised. As an example of the video format whose luminance scheme is the HLG scheme, ARIB STD-B67 or the like is raised. However, the first video format, the second video format, the luminance scheme of the first video format, and the luminance scheme of the second video format are not limited to those examples but may be arbitrary video formats and arbitrary luminance schemes.

Next, the video signal acquisition unit 3 extracts the meta-information from the HDR video signal following the first video format (step S1). Note that the video signal conversion device 1 according to this embodiment extracts the meta-information from the HDR video signal following the first video format but may acquire the meta-information from a different transmission path from the HDR video signal following the first video format.

Next, the video signal conversion unit 5 converts the video signal following the first video format, which is acquired by the video signal acquisition unit 3, into the high dynamic range video signal following the second video format (step S2).

Next, the video signal coding unit 6 codes the HDR video signal following the second video format, which is converted by the video signal conversion unit 5 (step S3).

Meanwhile, the audio signal acquisition unit 4 acquires the audio signal that corresponds to the HDR video signal following the first video format, which is acquired by the video signal acquisition unit 3 (step S4). Next, the audio signal coding unit 8 codes the audio signal acquired by the audio signal acquisition unit 4 (step S5). Note that the processing order of steps S0 to S3 and steps S4 and S5 is arbitrary.

Meanwhile, the generation unit 7 generates the descriptor that indicates the parameter of each of the pieces of meta-information from the meta-information that is extracted by the video signal acquisition unit 3 in step S1 (step S6). Note that in this embodiment, the descriptor that indicates the parameter of each of the pieces of meta-information is a descriptor that is stored in an MPEG-H event information table (MH-EIT).

As the next process to steps S0 to S6, the multiplexing unit 9 multiplexes the HDR video signal following the second video format, which is coded by the video signal coding unit 6, the descriptor, which is generated by the generation unit 7 and indicates the parameter of each of the pieces of meta-information, and the audio signal, which is coded by the audio signal coding unit 8, with the data in the MPEG media transport (MMT) format (step S7). Note that in this embodiment, as a method of multiplexing the descriptor, which is generated by the generation unit 7 and indicates the parameter of each of the pieces of meta-information, with the data in the MMT format, a method of storing the descriptor that indicates the parameter of each of the pieces of meta-information in the MH-EIT is used.

Next, the addition unit 10 adds the descriptor, which indicates that the HDR video signal following the first video format is converted into the HDR video signal following the second video format, as the supplementary information to the data in the MMT format, which are multiplexed by the multiplexing unit 9 (step S8). Accordingly, in the video signal conversion device 20 that will be described later, a fact that the acquired HDR video signal following the second video format is the HDR video signal that is converted from the HDR video signal following the first video format may be recognized.

Next, the encryption unit 11 encrypts the data in the MMT format to which the descriptor is added by the addition unit 10 and outputs the data to the transmission unit 13 via the output unit 12 (step S9). Next, the transmission unit 13 transmits the encrypted MMT format data, which are output by the output unit 12, as the broadcast wave (step S10).

(Examples of Meta-information)

As an example of a format of the meta-information that is extracted from the HDR video signal following the first video format by the video signal acquisition unit 3, SMPTE ST 2086 or the like may be raised. Further, as the example of the meta-information, the meta-information provided by SMPTE ST 2086 will be indicated below.

5.1 Display Primaries 5.2 Chromaticity of White Point 5.3 Maximum Display Mastering Luminance 5.4 Minimum Display Mastering Luminance 5.1 Display Primaries indicates information about a master display that is used for evaluating the HDR video signal. 5.2 Chromaticity of White Point indicates the white level. 5.3 Maximum Display Mastering Luminance indicates the maximum luminance indicated by the HDR video signal. 5.4 Minimum Display Mastering Luminance indicates the minimum luminance indicated by the HDR video signal. Further, as another example of the meta-information, the average luminance or the like may be raised.

(Examples of Descriptors Indicating Conversion from HDR Video Signal Following First Video Format into HDR Video Signal Following Second Video Format)

A description will be made below about examples of the descriptors that are added to the data in the MMT format by the addition unit 10 and indicate that the HDR video signal following the first video format is converted into the HDR video signal following the second video format.

The following descriptors are video component descriptors that are provided by ARIB STD-B60 7.4.3.19.

```
Video_Component_Descriptor ( ){
    descriptor_tag
    descriptor_length
    video_resolution
    video_aspect_ratio
    video_scan_flag
    Reserved
    video_frame_rate
    component_tag
    video_transfer_characteristics
    reserved
    ISO_639_language_code
    for (i=0; i<N; i++) {
        text_char
    }
}
```

The descriptors correspond to video usability information (VUI) that complies with the HEVC standard and are described in a second loop of an MMT package table (MPT). Note that the MPT is a table in which information about a package of a video signal following the MPEG media transport (MMT) format is described.

Here, an example will be indicated below where the descriptor of video_transfer_characteristics (video signal transfer characteristics) is used to indicate that the HDR video signal following the first video format is converted into the HDR video signal following the second video format.

video_transfer_characteristics

0→the video signal transfer characteristics are not designated

1→transfer_characteristics of VUI=1 (Rec. ITU-R BT.709-5)

2→transfer_characteristics of VUI=11 (IEC 61966-2-4)

3→transfer_characteristics of VUI=14 (Rec. ITU-R BT.2020)

4→transfer_characteristics of VUI=16 (SMPTE ST 2084)

5→transfer_characteristics of VUI=18 (ARIB STD-B67)

6 to 15→reserves for future use

As indicated by the above example, the video format of the video signal, which indicates transfer_characteristics=1, is Rec. ITU-R BT.709-5. Then, a value of 1 is assigned to video_transfer_characteristics of the video format of Rec. ITU-R BT.709-5. Further, a value of 2 is assigned to video_transfer_characteristics of IEC 61966-2-4, for which transfer_characteristics is 11. A value of 3 is assigned to video_transfer_characteristics of Rec. ITU-R BT.2020, for which transfer_characteristics is 14. Further, a value of 4 is assigned to video_transfer_characteristics of SMPTE ST 2084, for which transfer_characteristics is 16. A value of 5 is assigned to video_transfer_characteristics of ARIB STD-B67, for which transfer_characteristics is 18. Then, a value that is at least any one of 6 to 15 as the values of video_transfer_characteristics is used to indicate that the HDR video signal following the first video format is converted into the HDR video signal following the second video format. For example, a value of 6 is assigned to video_transfer_characteristics of the video signal following ARIB STD-B67 (the HDR video signal following the video format of the HLG scheme), which is converted from the video signal following SMPTE ST 2084 (the HDR video signal following the video format of the PQ scheme). Further, conversely, a value of 7 is assigned to video_transfer_characteristics of the video signal following SMPTE ST 2084 (the HDR video signal following the video format of the PQ scheme), which is converted from the video signal following ARIB STD-B67 (the HDR video signal following the video format of the HLG scheme). Then, the video signal conversion device 1 according to this embodiment adds the descriptors that are set in such a manner to the MMT package table (MPT) that accompanies the HDR video signal following the second video format. Then, the receiver, which receives the HDR video signal to which the descriptors are added in such a manner, reads the descriptors and may thereby recognize which video format is followed by the HDR video signal from which the HDR video signal is converted.

(Modification Example of Video Signal Conversion Device 1)

Note that in this embodiment, the video signal conversion device 1 outputs the converted HDR video signal following the second video format as the data in the MMT format. However, the format of the data in a case where the video signal conversion device 1 outputs the HDR video signal following the second video format is not limited to this. For example, the video signal conversion device 1 may output the converted HDR video signal following the second video format as data in an MPEG2-TS format.

In this case, in the process of step S7, the multiplexing unit 9 multiplexes the HDR video signal following the second video format, which is coded by the video signal coding unit 6, the descriptor, which is generated by the generation unit 7 and indicates the parameter of each of the pieces of meta-information, and the audio signal, which is coded by the audio signal coding unit 8, with the data in the MPEG2-TS format.

Further, in step S8, the addition unit 10 adds the descriptor, which indicates that the HDR video signal following the first video format is converted into the HDR video signal following the second video format, as the supplementary information to the data in the MPEG2-TS format, which are multiplexed by the multiplexing unit 9.

Next, in step S9, the encryption unit 11 encrypts the data in the MPEG2-TS format to which the descriptor is added by the addition unit 10 and outputs the data to the transmission unit 13 via the output unit 12.

Next, in step S10, the transmission unit 13 transmits the data in the MPEG2-TS format, which are encrypted by the encryption unit 11 and are output by the output unit 12, as the broadcast wave.

(Examples of Descriptors Indicating Conversion from HDR Video Signal Following First Video Format into HDR Video Signal Following Second Video Format in Modification Example of Video Signal Conversion Device 1)

Further, as described in the modification example of the video signal conversion device 1, examples of the descriptors will be described in the following, the descriptors indicating that the HDR video signal following the first video format is converted into the HDR video signal following the second video format in a case where the video signal conversion device 1 outputs the converted HDR video signal following the second video format as the data in the MPEG2-TS format.

As the descriptor that indicates that the HDR video signal following the first video format is converted into the HDR video signal following the second video format, for example, a video decode control descriptor that is provided by ARIB STD-B10 is used. The video decode control descriptor is described in a program mapped table (PMT). The video decode control descriptors will be indicated below.

```
video_decode_control_descriptor( ){
descriptor_tag
descriptor_length
still_picture_flag
sequence_end_code_flag
video_encode_format
transfer_characteristics
}
```

Here, an example will be indicated below where the descriptor of transfer_characteristics (transfer characteristics) is used to indicate that the HDR video signal following the first video format is converted into the HDR video signal following the second video format.

00→transfer_characteristics of VUI=1, 11, 14
(Rec. ITU-R BT.709-5, IEC 61966-2-4, Rec. BT.2020)
01→transfer_characteristics of VUI=16
(SMPTE ST 2084)
10→transfer_characteristics of VUI=18
(ARIB STD-B67)
11→the transfer characteristics are not designated As indicated by the above example, the video formats of the video signals, which are indicated by transfer_characteristics of VUI=1, 11, and 14, are respectively Rec. ITU-R BT.709-5, IEC 61966-2-4, and Rec. ITU-R BT.2020. Then, a value of 00 is assigned to the video decode control descriptor of transfer_characteristics in those video formats. Then, in this case, the value of 00 may be used as the value of transfer characteristics in a case where the transfer characteristics are not designated. The reason is because processing about the HDR does not have to be performed for the video signal following each of the above video formats and similar processing to a case where the transfer characteristics are not designated may be executed.

Then, instead, a value of 11, which is the value in a case where the transfer characteristics are not designated, is used to indicate that the HDR video signal following the first video format is converted into the HDR video signal following the second video format. For example, a value of 11 is assigned to transfer_characteristics of the video signal following ARIB STD-B67 (the HDR video signal following the video format of the HLG scheme), which is converted from the video signal following SMPTE ST 2084 (the HDR video signal following the video format of the PQ scheme).

Further, the descriptor, which indicates that the HDR video signal following the first video format is converted into the HDR video signal following the second video format, may be transmitted by using another transmission path. For example, in a case where the video decode control descriptor of transfer_characteristics is a value of 10, the video signal conversion device 1 transmits the descriptor, which indicates that the luminance scheme of the unconverted video format of the HDR video signal to be transmitted is the PQ, through a transmission path of an EIT or hybridcast. Note that the descriptor may be a descriptor that indicates the above-described meta-information such as the master display information or the maximum luminance In this case, the descriptor that indicates the meta-information is recognized on the receiver side, and it may thereby be determined that the luminance scheme of the unconverted video format of the received video signal is the PQ.

(Examples of MH-EIT)

FIG. 4(*a*) is a diagram that illustrates one example of the MH-EIT that is generated by the generation unit 7. A descriptor D1 in the MH-EIT indicated in FIG. 4(*a*) includes the meta-information of each content.

FIG. 4(*b*) is a diagram that illustrates another example of the descriptor D1 that includes the meta-information in the MH-EIT indicated in FIG. 4(*a*). In the example illustrated in FIG. 4(*b*), as the value of descriptor_tag in the descriptor D1, "0x4E" that indicates an extended form event descriptor is described. In the extended form event descriptor, specific information about the content is described as a text. Thus, as illustrated in FIG. 4(*b*), a configuration is possible in which the text which indicates the meta-information of each content is described in Text_char in the descriptor D1. In the example illustrated in FIG. 4(*b*), an arbitrary text that indicates the parameter of the meta-information is described (* indicates an arbitrary text), and a meta-information read-out unit 28 included in the video signal conversion device 20**, which will be described later, acquires the parameter of the meta-information by analyzing the text. Note that in a case where a configuration is employed in which a description is made while a predetermined hashtag such as "#", for example, is added to the text described in Text_char, an assessment about whether or not the text is a text that indicates the meta-information related to the HDR video signal following the first video format may be made easy.

(Video Signal Conversion Device 20)

The video signal conversion device 20 according to the first embodiment of the present invention acquires the HDR video signal following the second video format, which is output by the above-described video signal conversion device 1, and converts the HDR video signal following the second video format into the HDR video signal following the first video format.

The video signal conversion device 20 according to the first embodiment of the present invention will be described with reference to FIG. 5. FIG. 5 is a block diagram that illustrates a configuration of the video signal conversion device 20 according to this embodiment. As illustrated in FIG. 5, the video signal conversion device 20 includes a reception unit 21, a processing unit 22, and a display control unit 31. In such a manner, the video signal conversion device 20 includes the reception unit 21 and may thus be referred to as reception device.

The reception unit 21 receives the encrypted data in the MMT format (the encrypted MMT format data), which are output by the video signal conversion device 1.

The processing unit 22 includes a demodulation unit 23, an encryption decoding unit 24, a demultiplexing unit 25, a video signal decoding unit 26, an audio signal decoding unit 27, the meta-information read-out unit 28, a read-out unit 29, and a video signal conversion unit 30.

The demodulation unit 23 demodulates the encrypted MMT format data, which are received by the reception unit 21.

The encryption decoding unit 24 decodes the encrypted MMT format data, which are demodulated by the demodulation unit 23.

The demultiplexing unit 25 demultiplexes the MMT format data decoded by the encryption decoding unit 24 into the HDR video signal following the second video format, the audio signal that corresponds to the video signal, and the MH-EIT that includes the meta-information related to the HDR video signal following the first video format.

The video signal decoding unit 26 decodes the HDR video signal following the second video format, which is separated by demultiplexing by the demultiplexing unit 25.

The audio signal decoding unit 27 decodes the audio signal, which is separated by demultiplexing by the demultiplexing unit 25.

The meta-information read-out unit 28 reads out the meta-information related to the HDR video signal following the first video format from the MH-EIT, which is separated by demultiplexing by the demultiplexing unit 25.

The read-out unit 29 reads out the descriptor, which indicates that the HDR video signal following the first video format is converted into the HDR video signal following the second video format, from the MPT that accompanies the HDR video signal following the second video format, which is decoded by the video signal decoding unit 26.

In a case where the read-out unit 29 reads out the descriptor, which indicates conversion from the high dynamic range video signal following the first video format, from the high dynamic range video signal following the second video format, the video signal conversion unit 30 converts the HDR video signal following the second video format into the HDR video signal following the first video format. Further, the video signal conversion unit 30 superimposes the parameter of each of the pieces of meta-information, which is read out by the meta-information read-out unit 28, on Info Frame of HDMI® and outputs the parameter together with the HDR video signal following the first video format.

The display control unit 31 refers to the HDR video signal following the first video format and the meta-information, which are output by the video signal conversion unit 30, and thereby controls the display device (not illustrated).

Figure 6:
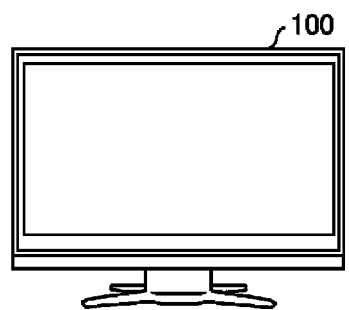
FIG. 6 is a diagram that illustrates an external appearance of a television image receiver 100 which includes the video signal conversion device 20 according to the first embodiment of the present invention.

Further, the invention of the present application also includes a television image receiver 100 that includes the video signal conversion device 20 according to this embodiment and a video signal conversion device 50, which will be described later. The television image receiver 100 that includes the video signal conversion device 20 according to this embodiment will be illustrated in FIG. 6.

(Action of Video Signal Conversion Device 20)

Figure 7:
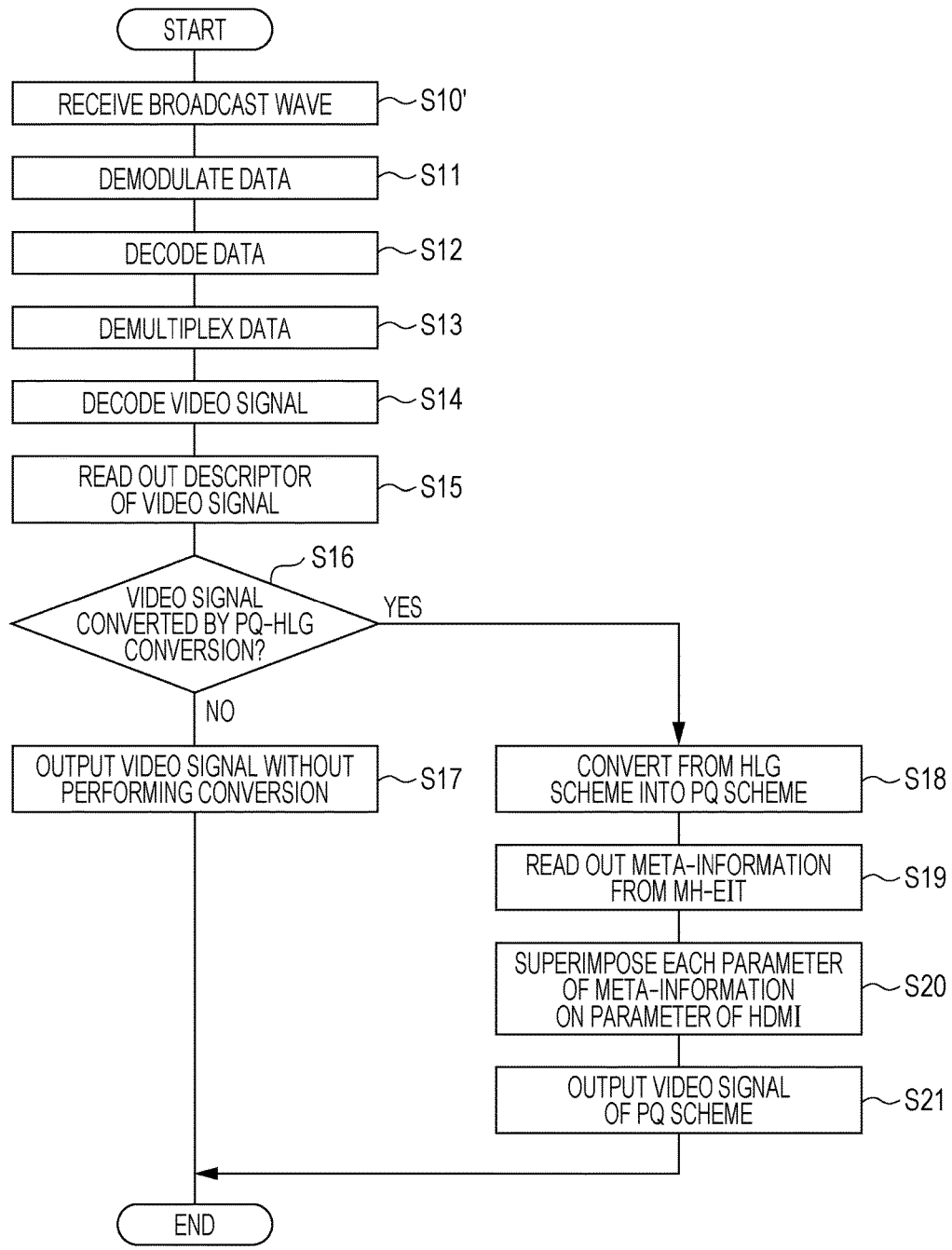
FIG. 7 is a flowchart that explains a video signal conversion method of the video signal conversion device 20 according to the first embodiment of the present invention.

A video signal conversion method executed by the video signal conversion device 20 according to this embodiment will be described with reference to FIG. 7. FIG. 7 is a flowchart that illustrates the video signal conversion method executed by the video signal conversion device 20 according to this embodiment.

First, the reception unit 21 receives the encrypted data in the MMT format (the encrypted MMT format data), which are output by the video signal conversion device 1 (step S10').

Next, the demodulation unit 23 demodulates the encrypted MMT format data, which are received by the reception unit 21 (step S11).

Next, the encryption decoding unit 24 decodes the encrypted MMT format data, which are demodulated by the demodulation unit 23 (step S12).

Next, the demultiplexing unit 25 demultiplexes the MMT format data decoded by the encryption decoding unit 24 into the HDR video signal following the second video format, the audio signal that corresponds to the video signal, and the MH-EIT that includes the meta-information related to the HDR video signal following the first video format (step S13). Note that the audio signal that is separated by demultiplexing by the demultiplexing unit 25 is decoded by the audio signal decoding unit 27 and is output by an audio output device, which is not illustrated. In the following, a description will be made about processing for the HDR video signal following the second video format and the audio signal corresponding to the video signal, which are separated by demultiplexing by the demultiplexing unit 25.

As the next process to step S13, the video signal decoding unit 26 decodes the HDR video signal following the second video format, which is separated by demultiplexing by the demultiplexing unit 25 (step S14).

Next, the read-out unit 29 reads out the descriptor, which indicates that the HDR video signal following the first video format is converted into the HDR video signal following the second video format, from the MPT that accompanies the HDR video signal following the second video format, which is decoded by the video signal decoding unit 26 (step S15).

Next, the read-out unit 29 refers to the descriptor that is read out and thereby assesses whether or not the HDR video signal following the second video format is the HDR video signal that is converted from the HDR video signal following the first video format (step S16).

In this embodiment, as a method in which the read-out unit 29 assesses whether or not the HDR video signal following the second video format is the HDR video signal that is converted from the HDR video signal following the first video format, a method is used in which the assessment is made by referring to the value of video_transfer_characteristics in the MPT which accompanies the HDR video signal following the second video format.

For example, a value of 6 is assigned to video_transfer_characteristics of the video signal following ARIB STD-B67 (the HDR video signal following the video format of the HLG scheme), which is converted from the video signal following SMPTE ST 2084 (the HDR video signal following the video format of the PQ scheme). Then, in a case where the read-out unit 29 reads out that video_transfer_ characteristics takes a value of 6, the read-out unit 29 may assess that the HDR video signal following the second video format is the HDR video signal that is converted from the HDR video signal following the first video format.

In a case where the read-out unit 29 assesses that the HDR video signal following the second video format is not the HDR video signal that is converted from the HDR video signal following the first video format (NO in step S16), the video signal conversion unit 30 outputs the HDR video signal following the second video format to the display control unit 31 without processing the HDR video signal following the second video format (step S17).

In a case where the read-out unit 29 assesses that the HDR video signal following the second video format is the HDR video signal that is converted from the HDR video signal following the first video format (YES in step S16), the video signal conversion unit 30 converts the HDR video signal following the second video format into the HDR video signal following the first video format (step S18).

Next, the meta-information read-out unit 28 reads out the meta-information related to the HDR video signal following the first video format from the MH-EIT, which is separated by demultiplexing by the demultiplexing unit 25 (step S19).

Next, the video signal conversion unit 30 superimposes the parameter of each of the pieces of meta-information, which is read out by the meta-information read-out unit 28, on Info Frame of HDMI® (step S20). Next, the video signal conversion unit 30 outputs the converted HDR video signal following the first video format together with Info Frame of HDMI® on which the meta-information is superimposed to the display control unit 31 (step S21).

(Examples of Descriptors of Parameters of Respective Pieces of Meta-information Superimposed on Info Frame of HDMI®)

As examples of the descriptors of the parameters of the respective pieces of meta-information which the video signal conversion unit 30 superimposes on Info Frame of HDMI®, the descriptors provided by CEA 861.3 may be raised. FIG. 8 is a table that illustrates the descriptors which are provided by CEA 861.3.

In FIG. 8, the descriptors that correspond to Data Byte 3 to 22 include display mastering data that are provided by SMPTE ST 2086. For example, max_display_mastering_luminance that corresponds to Data Byte 19 and 20 indicates the maximum luminance value. Further, min_display_mastering_luminance that corresponds to Data Byte 21 and 22 indicates the minimum luminance value. Maximum Content Light Level that corresponds to Data Byte 23 and 24 indicates the maximum luminance level (MAX CLL). Maximum Frame-average Light Level that corresponds to Data Byte 25 and 26 indicates the maximum frame average luminance level (MAX FALL).

(Modification Example 1 of Video Signal Conversion Device 20)

The video signal conversion device 20 according to this embodiment, which is described above, superimposes the parameter of each of the pieces of meta-information on Info Frame of HDMI® and outputs the HDR video signal following the first video format together with Info Frame of HDMI® on which the meta-information is superimposed to the display control unit 31. However, the video signal conversion device 20 according to the present invention is not limited to this. For example, the video signal conversion device 20 may not process the meta-information that are read out from the MH-EIT by the above-described meta-information read-out unit 28 and may thereby output the meta-information to the display control unit 31 without any change. Further, in another modification example, the video signal conversion device 20 may not include the display control unit 31 and may output the HDR video signal following the first video format together with the meta-information read out from the MH-EIT or the meta-information superimposed on Info Frame of HDMI® to an external display device.

(Modification Example 2 of Video Signal Conversion Device 20)

Note that in this embodiment, the video signal conversion device 20 receives the encrypted data in the MMT format, which are output by the video signal conversion device 1. However, the format of the data that are received by the video signal conversion device 20 is not limited to this. For example, the video signal conversion device 20 may receive the encrypted data in the MPEG2-TS format, which are output by the video signal conversion device 1. In a description made below, a modification example will be described where the video signal conversion device 20 receives the encrypted data in the MPEG2-TS format, which are output by the video signal conversion device 1. A video signal conversion method executed by the video signal conversion device according to this modification example will be described with reference to FIG. 9. FIG. 9 is a flowchart that illustrates the video signal conversion method executed by the video signal conversion device 20 according to this modification example.

First, the reception unit 21 receives the encrypted data in the MPEG2-TS format, which are output by the video signal conversion device 1 (step S90).

Next, the demodulation unit 23 demodulates the encrypted data in the MPEG2-TS format, which are received by the reception unit 21 (step S91).

Next, the encryption decoding unit 24 decodes the encrypted data in the MPEG2-TS format, which are demodulated by the demodulation unit 23 (step S92).

Next, the demultiplexing unit 25 demultiplexes the data in the MPEG2-TS format, which are decoded by the encryption decoding unit 24, into the HDR video signal following the second video format, the audio signal that corresponds to the video signal, and the EIT that includes the meta-information related to the HDR video signal following the first video format (step S93).

Next, the video signal decoding unit 26 decodes the HDR video signal following the second video format, which is separated by demultiplexing by the demultiplexing unit 25 (step S94).

Next, the read-out unit 29 reads out the descriptor, which indicates that the HDR video signal following the first video format is converted into the HDR video signal following the second video format, from the PMT that accompanies the HDR video signal following the second video format, which is decoded by the video signal decoding unit 26 (step S95).

Next, the read-out unit 29 refers to the descriptor that is read out and thereby assesses whether or not the HDR video signal following the second video format is the HDR video signal that is converted from the HDR video signal following the first video format (step S96).

In this modification example, as a method in which the read-out unit 29 assesses whether or not the HDR video signal following the second video format is the HDR video signal that is converted from the HDR video signal following the first video format, a method is used in which the assessment is made by referring to the value of transfer_characteristics in the PMT which accompanies the HDR video signal following the second video format.

For example, a value of 11 is assigned to transfer_characteristics of the video signal following ARIB STD-B67 (the HDR video signal following the video format of the HLG scheme), which is converted from the video signal following SMPTE ST 2084 (the HDR video signal following the video format of the PQ scheme). Then, in a case where the read-out unit 29 reads out that transfer_characteristics takes a value of 11, the read-out unit 29 may assess that the HDR video signal following the second video format is the HDR video signal that is converted from the HDR video signal following the first video format.

In a case where the read-out unit 29 assesses that the HDR video signal following the second video format is not the HDR video signal that is converted from the HDR video signal following the first video format (NO in step S96), the video signal conversion unit 30 outputs the HDR video signal following the second video format to the display control unit 31 without processing the HDR video signal following the second video format (step S97).

In a case where the read-out unit 29 assesses that the HDR video signal following the second video format is the HDR video signal that is converted from the HDR video signal following the first video format (YES in step S96), the video signal conversion unit 30 converts the HDR video signal following the second video format into the HDR video signal following the first video format (step S98).

Next, the meta-information read-out unit 28 reads out the meta-information related to the HDR video signal following the first video format from the EIT, which is separated by demultiplexing by the demultiplexing unit 25 (step S99).

Next, the video signal conversion unit 30 superimposes the parameter of each of the pieces of meta-information, which is read out by the meta-information read-out unit 28, on Info Frame of HDMI® (step S100).

Next, the video signal conversion unit 30 outputs the converted HDR video signal following the first video format together with Info Frame of HDMI® on which the meta-information is superimposed to the display control unit 31 (step S101).

(Modification Example 3 of Video Signal Conversion Device 20)

Figure 10:
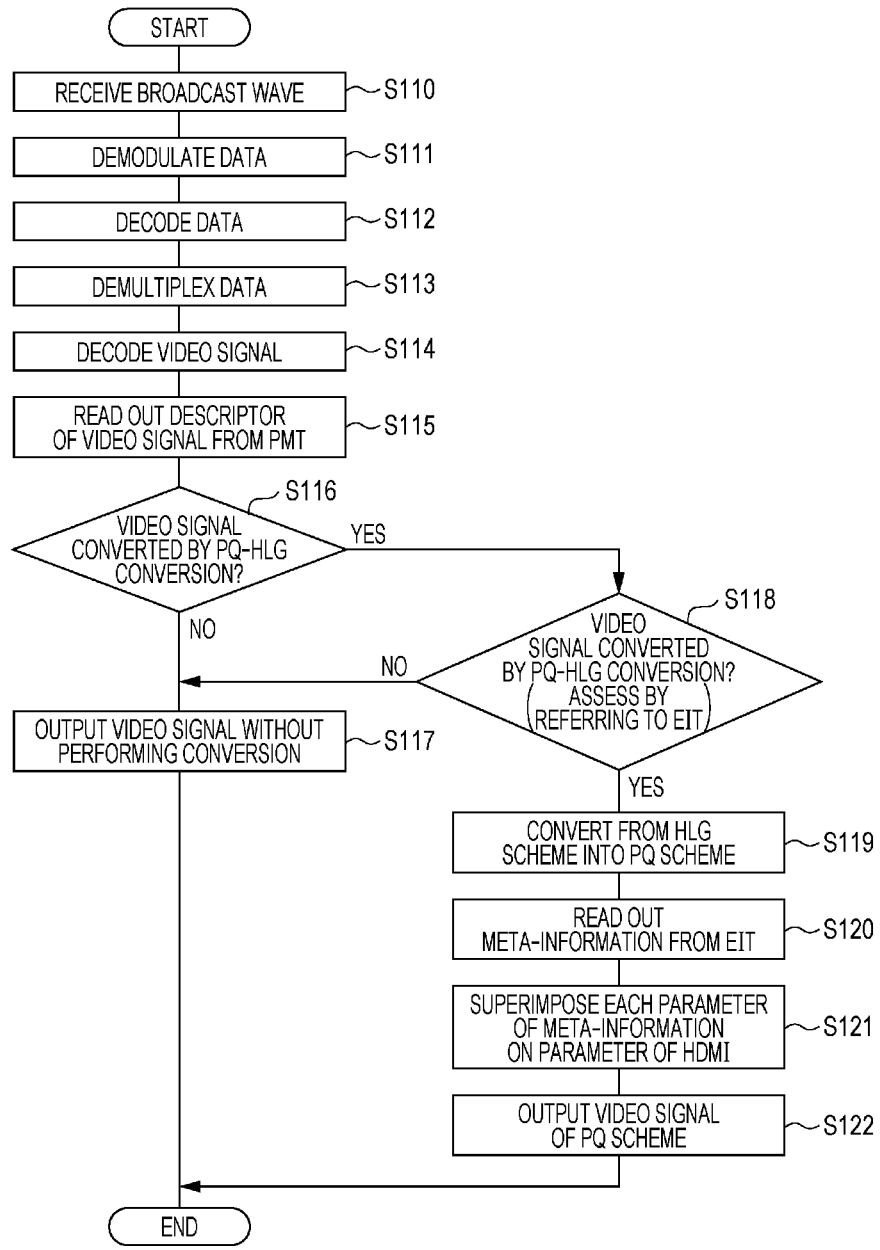
FIG. 10 is a flowchart that explains a video signal conversion method of the video signal conversion device 20 according to a modification example 3 of the first embodiment of the present invention.

In this modification example, another modification example will be described where the video signal conversion device 20 receives the encrypted data in the MPEG2-TS format, which are output by the video signal conversion device 1. A video signal conversion method executed by the video signal conversion device according to this modification example will be described with reference to FIG. 10. FIG. 10 is a flowchart that illustrates the video signal conversion method executed by the video signal conversion device 20 according to this modification example.

First, the reception unit 21 receives the encrypted data in the MPEG2-TS format, which are output by the video signal conversion device 1 (step S110).

Next, the demodulation unit 23 demodulates the encrypted data in the MPEG2-TS format, which are received by the reception unit 21 (step S111).

Next, the encryption decoding unit 24 decodes the encrypted data in the MPEG2-TS format, which are demodulated by the demodulation unit 23 (step S112).

Next, the demultiplexing unit 25 demultiplexes the data in the MPEG2-TS format, which are decoded by the encryption decoding unit 24, into the HDR video signal following the second video format, the audio signal that corresponds to the video signal, and the EIT that includes the meta-information related to the HDR video signal following the first video format (step S113).

Next, the video signal decoding unit 26 decodes the HDR video signal following the second video format, which is separated by demultiplexing by the demultiplexing unit 25 (step S114).

Next, the read-out unit 29 reads out the descriptor, which indicates that the HDR video signal following the first video format is converted into the HDR video signal following the second video format, from the PMT that accompanies the HDR video signal following the second video format, which is decoded by the video signal decoding unit 26 (step S115).

Next, the read-out unit 29 refers to the descriptor that is read out and thereby assesses whether or not the HDR video signal following the second video format is the HDR video signal that is converted from the HDR video signal following the first video format (step S116).

In this modification example, as a method in which the read-out unit 29 assesses whether or not the HDR video signal following the second video format is the HDR video signal that is converted from the HDR video signal following the first video format, a method is used in which the assessment is made by referring to the value of transfer_characteristics in the PMT which accompanies the HDR video signal following the second video format.

In a case where the read-out unit 29 assesses that the HDR video signal following the second video format is not the HDR video signal that is converted from the HDR video signal following the first video format (NO in step S116), the video signal conversion unit 30 outputs the HDR video signal following the second video format to the display control unit 31 without processing the HDR video signal following the second video format (step S117).

In a case where the read-out unit 29 assesses that the HDR video signal following the second video format is the HDR video signal that is converted from the HDR video signal following the first video format (YES in step S116), the meta-information read-out unit 28 refers to the EIT that is separated by demultiplexing by the demultiplexing unit 25 and thereby assesses whether or not the HDR video signal following the second video format is the HDR video signal that is converted from the HDR video signal following the first video format (step S118). Note that a method, in which the meta-information read-out unit 28 refers to the EIT and thereby assesses whether or not the HDR video signal following the second video format is the HDR video signal that is converted from the HDR video signal following the first video format, is not particularly limited. For example, the meta-information read-out unit 28 may assess whether or not the EIT includes the meta-information related to the HDR video signal following the first video format and may thereby assess whether or not the HDR video signal following the second video format is the HDR video signal that is converted from the HDR video signal following the first video format.

In a case where the meta-information read-out unit 28 refers to the EIT and assesses that the HDR video signal following the second video format is not the HDR video signal that is converted from the HDR video signal following the first video format (NO in step S118), the processing moves to step S117, and the video signal conversion unit 30 outputs the HDR video signal following the second video format to the display control unit 31 without processing the HDR video signal following the second video format.

In a case where the meta-information read-out unit 28 refers to the EIT and thereby assesses that the HDR video signal following the second video format is the HDR video signal that is converted from the HDR video signal following the first video format (YES in step S118), the video signal conversion unit 30 converts the HDR video signal following the second video format into the HDR video signal following the first video format (step S119).

Next, the meta-information read-out unit 28 reads out the meta-information related to the HDR video signal following the first video format from the EIT, which is separated by demultiplexing by the demultiplexing unit 25 (step S120).

Next, the video signal conversion unit 30 superimposes the parameter of each of the pieces of meta-information, which is read out by the meta-information read-out unit 28, on Info Frame of HDMI® (step S121).

Next, the video signal conversion unit 30 outputs the converted HDR video signal following the first video format together with Info Frame of HDMI® on which the meta-information is superimposed to the display control unit 31 (step S122).

(Conclusion of First Embodiment)

As described in the above, in the video signal conversion system according to this embodiment, the video signal conversion device 1 converts the high dynamic range video signal following the first video format into the high dynamic range video signal following the second video format and outputs the meta-information related to the high dynamic range video signal following the first video format. Further, the video signal conversion device 20 acquires the meta-information related to the high dynamic range video signal following the first video format, which is output by the video signal conversion device 1, refers to the meta-information, and thereby converts the high dynamic range video signal following the second video format, which is output by the video signal conversion device 1, into the high dynamic range video signal following the first video format. Accordingly, even in a case where the HDR video signal following the first video format is converted into the HDR video signal following the second video format on the transmitter side, the meta-information related to the HDR video signal following the original first video format is not lost. Further, even in a case where the HDR video signal following the second video format, which is converted from the HDR video signal following the first video format, is converted into the HDR video signal following the original first video format on the receiver side, the image quality of the HDR video signal following the original first video format may be maintained.

[Second Embodiment]

The video signal conversion system according to this embodiment will be described in detail. The video signal conversion system according to this embodiment includes a video signal conversion device 40 and a video signal conversion device 50, which will be described below. In the following, the video signal conversion device 40 and the video signal conversion device 50 will be described in detail. Note that also in the video signal conversion device 40 according to this embodiment, as described about the video signal conversion device 1 according to the first embodiment, the HDR video signal following the second video format may be transmitted as the data in the MMT format or may be transmitted as the data in the MPEG2-TS format. Note that also in the video signal conversion device 50 according to this embodiment, as described about the video signal conversion device 20 according to the first embodiment, the HDR video signal following the second video format may be received as the data in the MMT format or may be received as the data in the MPEG2-TS format.

(Video Signal Conversion Device 40)

Figure 11:
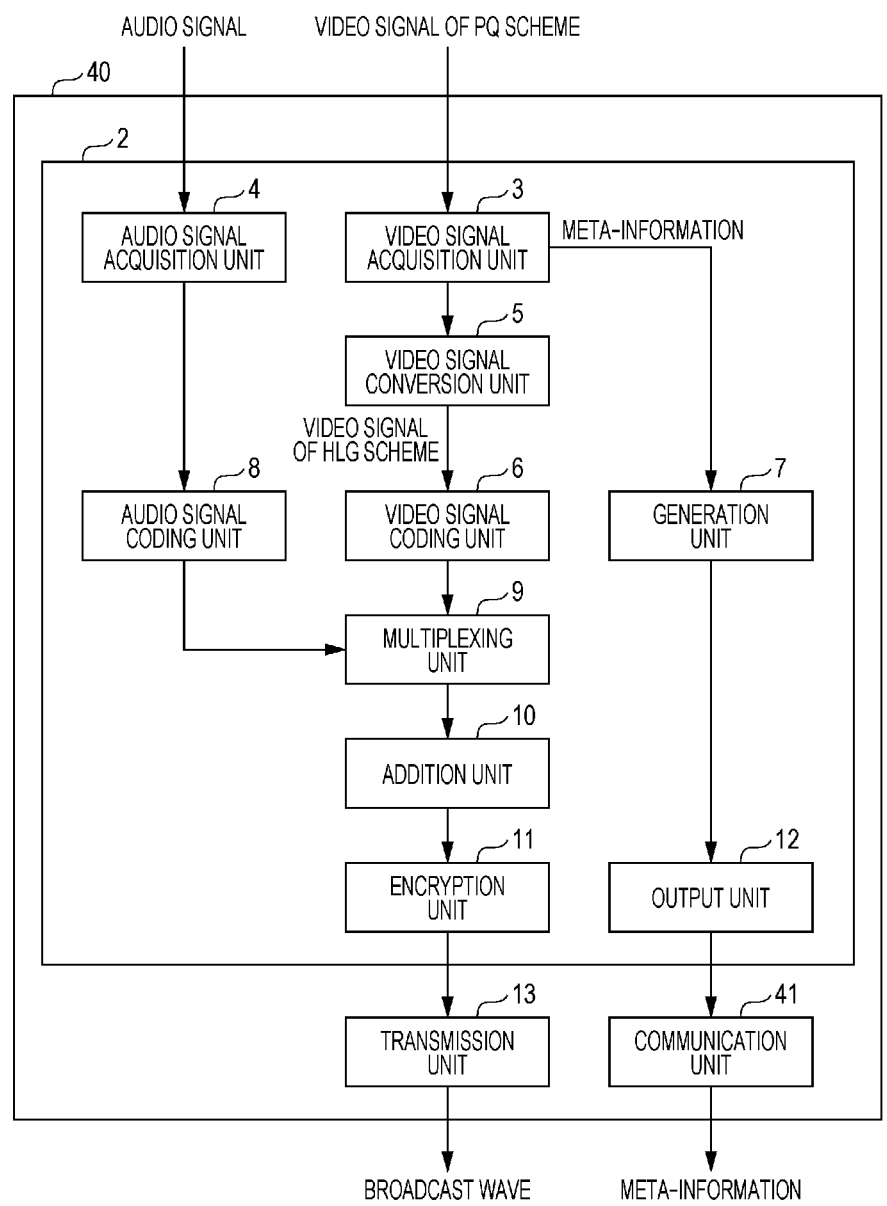
FIG. 11 is a block diagram that illustrates a configuration of a video signal conversion device 40 according to a second embodiment of the present invention.

The video signal conversion device 40 according to this embodiment will be described with reference to the drawings. Note that the video signal conversion device 40 according to this embodiment has a similar configuration to the video signal conversion device 1 according to the first embodiment except that the video signal conversion device 40 includes a communication unit 41. Thus, the same reference numerals will be given to members that have similar functions to the members described in the first embodiment, and a description thereof will not be made. FIG. 11 is a block diagram that illustrates a configuration of the video signal conversion device 40 according to this embodiment. As illustrated in FIG. 11, the video signal conversion device 40 further includes the communication unit 41 in addition to the configuration of the video signal conversion device 1 according to the first embodiment.

The communication unit 41 transmits the meta-information output by the output unit 12 through a different transmission path from the transmission path for transmitting the high dynamic range video signal following the second video format.

(Action of Video Signal Conversion Device 40)

Figure 12:
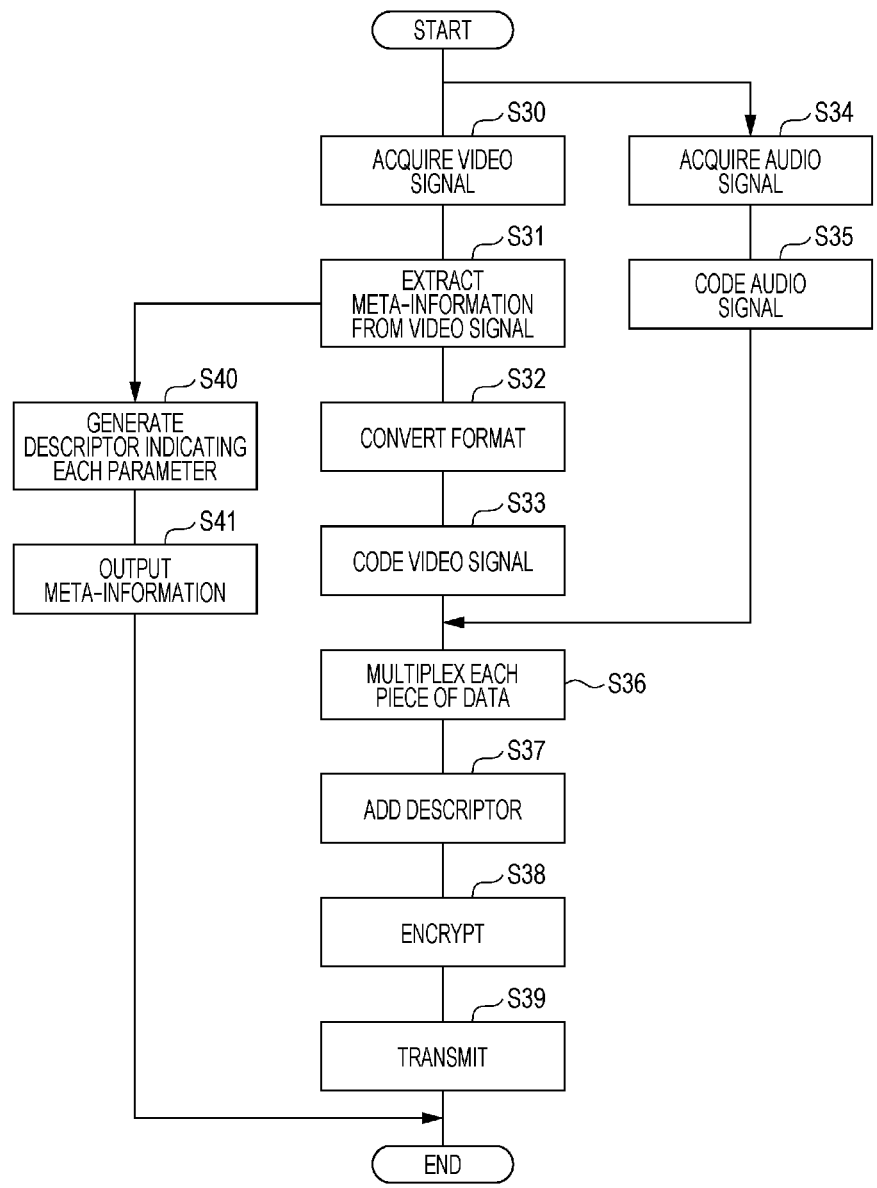
FIG. 12 is a flowchart that explains a video signal conversion method of the video signal conversion device 40 according to the second embodiment of the present invention.

FIG. 12 is a flowchart that explains an action of the video signal conversion device 40 according to this embodiment. Note that a description about similar processes to the processes that are described in the first embodiment will not be made.

First, the video signal acquisition unit 3 acquires the HDR video signal following the first video format (step S30). Next, the video signal acquisition unit 3 extracts the meta-information from the HDR video signal following the first video format (step S31). Next, the video signal conversion unit 5 converts the video signal following the first video format, which is acquired by the video signal acquisition unit 3, into the high dynamic range video signal following the second video format (step S32). Next, the video signal coding unit 6 codes the HDR video signal following the second video format, which is converted by the video signal conversion unit 5 (step S33).

Meanwhile, the audio signal acquisition unit 4 acquires the audio signal that corresponds to the HDR video signal following the first video format, which is acquired by the video signal acquisition unit 3 (step S34). Next, the audio signal coding unit 8 codes the audio signal acquired by the audio signal acquisition unit 4 (step S35).

Next, the multiplexing unit 9 multiplexes the HDR video signal following the second video format, which is coded by the video signal coding unit 6, with the audio signal coded by the audio signal coding unit 8 (step S36).

Next, the addition unit 10 adds the descriptor, which indicates that the HDR video signal following the first video format is converted into the HDR video signal following the second video format, as the supplementary information to the data multiplexed by the multiplexing unit 9 (step S37).

Next, the encryption unit 11 encrypts the data to which the descriptor is added by the addition unit 10 (step S38). Next, the transmission unit 13 outputs the data encrypted by the encryption unit 11 as a broadcast wave (step S39).

Meanwhile, the generation unit 7 generates the descriptor that indicates the parameter of each of the pieces of meta-information from the meta-information that is extracted by the video signal acquisition unit 3 in step S31 (step S40).

The output unit 12 outputs the descriptor that is generated by the generation unit 7 and indicates the parameter of each of the pieces of meta-information to an external portion via the communication unit 41 (step S41). Note that the communication unit 41 transmits the descriptor that is generated by the generation unit 7 and indicates the parameter of each of the pieces of meta-information through a different transmission path from the transmission path for transmitting the high dynamic range video signal following the second video format.

Here, as an example of the different transmission path from the transmission path for transmitting the high dynamic range video signal following the second video format, a transmission path via the Internet is raised. More specifically, the transmission path via the Internet may be Internet communication that accompanies Hybridcast®.

(Video Signal Conversion Device 50)

Figure 13:
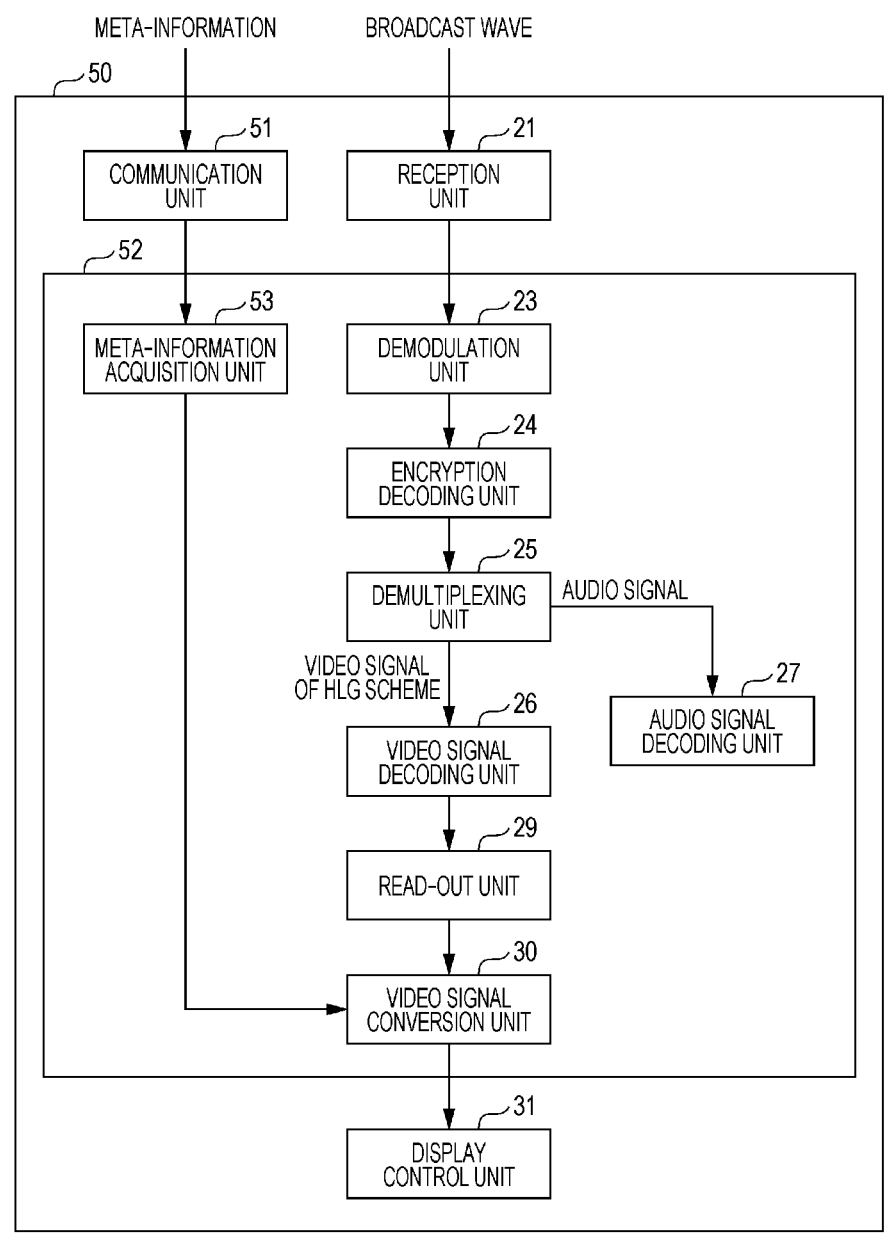
FIG. 13 is a block diagram that illustrates a configuration of a video signal conversion device 50 according to the second embodiment of the present invention.

The video signal conversion device 50 according to this embodiment will be described with reference to the drawings. Note that the video signal conversion device 50 according to this embodiment has a similar configuration to the video signal conversion device 20 according to the first embodiment except that the video signal conversion device 50 includes a communication unit 51 and includes a meta-information acquisition unit 53 of a processing unit 52. Thus, the same reference numerals will be given to members that have similar functions to the members described in the first embodiment, and a description thereof will not be made. FIG. 13 is a block diagram that illustrates a configuration of the video signal conversion device 50 according to this embodiment. As illustrated in FIG. 13, the video signal conversion device 50 includes the communication unit 51 and includes the meta-information acquisition unit 53 of the processing unit 52 in addition to the configuration of the video signal conversion device 20 according to the first embodiment.

The communication unit 51 receives the descriptor indicating the parameter of each of the pieces of meta-information, which is transmitted by the above-described video signal conversion device 40 through the different transmission path from the transmission path for transmitting the high dynamic range video signal following the second video format.

The meta-information acquisition unit 53 acquires the descriptor that is received by the communication unit 51 and indicates the parameter of each of the pieces of meta-information.

(Action of Video Signal Conversion Device 50)

Figure 14:
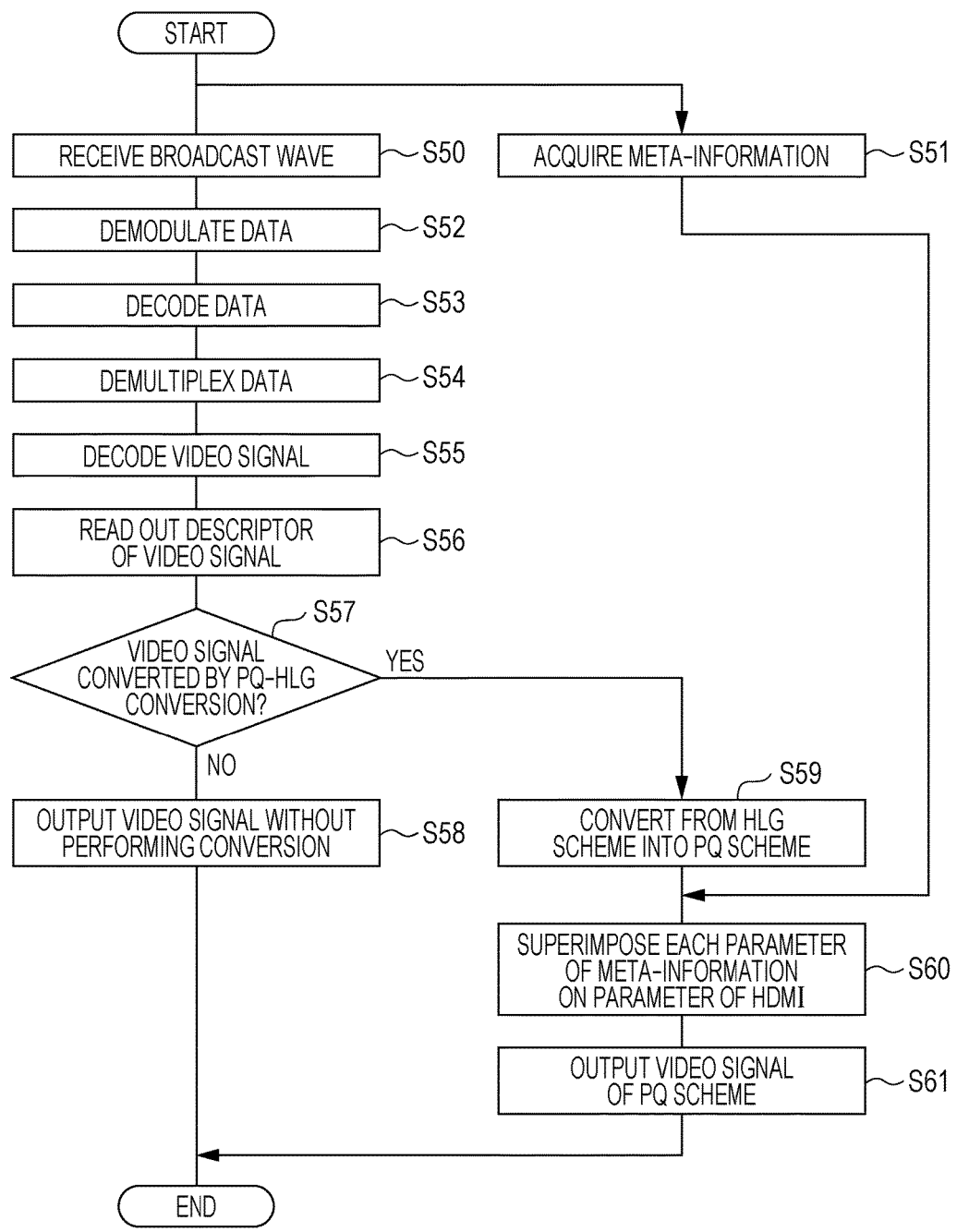
FIG. 14 is a flowchart that explains a video signal conversion method of the video signal conversion device 50 according to the second embodiment of the present invention.

FIG. 14 is a flowchart that explains an action of the video signal conversion device 50 according to this embodiment. Note that a description about similar processes to the processes that are described in the first embodiment will not be made.

First, the reception unit 21 receives the encrypted data (the data that include the high dynamic range video signal following the second video format), which are output by the video signal conversion device 40 (step S50).

Meanwhile, the meta-information acquisition unit 53 acquires the descriptor that is output by the video signal conversion device 40 and indicates the parameter of each of the pieces of meta-information via the communication unit 51 (step S51).

Next, the demodulation unit 23 demodulates the encrypted data, which are received by the reception unit 21 (step S52). Next, the encryption decoding unit 24 decodes the encrypted data, which are demodulated by the demodulation unit 23 (step S53).

Next, the demultiplexing unit 25 demultiplexes the data decoded by the encryption decoding unit 24 into the HDR video signal following the second video format and the audio signal that corresponds to the video signal (step S54).

Next, the video signal decoding unit 26 decodes the HDR video signal following the second video format, which is separated by demultiplexing by the demultiplexing unit 25 (step S55).

Next, the read-out unit 29 reads out the descriptor, which indicates that the HDR video signal following the first video format is converted into the HDR video signal following the second video format, from the HDR video signal following the second video format, which is decoded by the video signal decoding unit 26 (step S56).

Next, the read-out unit 29 refers to the descriptor that is read out and thereby assesses whether or not the HDR video signal following the second video format is the HDR video signal that is converted from the HDR video signal following the first video format (step S57).

In a case where the read-out unit 29 assesses that the HDR video signal following the second video format is not the HDR video signal that is converted from the HDR video signal following the first video format (NO in step S57), the video signal conversion unit 30 outputs the HDR video signal following the second video format to the display control unit 31 without processing the HDR video signal following the second video format (step S58).

In a case where the read-out unit 29 assesses that the HDR video signal following the second video format is the HDR video signal that is converted from the HDR video signal following the first video format (YES in step S57), the video signal conversion unit 30 converts the HDR video signal following the second video format into the HDR video signal following the first video format (step S59).

Next, the video signal conversion unit 30 superimposes the parameter of each of the pieces of meta-information, which is acquired by the meta-information acquisition unit 53, on Info Frame of HDMI® (step S60).

Next, the video signal conversion unit 30 outputs the converted HDR video signal following the first video format together with Info Frame of HDMI® on which the meta-information is superimposed to the display control unit 31 (step S61).

As described in the above, in the video signal conversion system according to this embodiment, the video signal conversion device 40 transmits the meta-information through the different transmission path from the transmission path for transmitting the high dynamic range video signal following the second video format. Further, the video signal conversion device 50 receives the meta-information, which is transmitted by the video signal conversion device 40 through the different transmission path from the transmission path for transmitting the high dynamic range video signal following the second video format. Accordingly, because the meta-information is transmitted through the transmission path that does not accompany the high dynamic range video signal following the second video format, the information amount of the meta-information to be transmitted may be increased. Further, because the meta-information is received through the transmission path that does not accompany the high dynamic range video signal following the second video format, the information amount of the meta-information to be received may be increased.

[Third Embodiment]

A third embodiment of the present invention will be described in the following. Note that video signal conversion devices and video signal conversion methods according to this embodiment are similar to the video signal conversion devices and video signal conversion methods according to the first embodiment except the video signal conversion method executed by the video signal conversion device 20 according to the first embodiment. Consequently, in the following, a video signal conversion method executed by the video signal conversion device 20 according to this embodiment will be described in detail.

Figure 15:
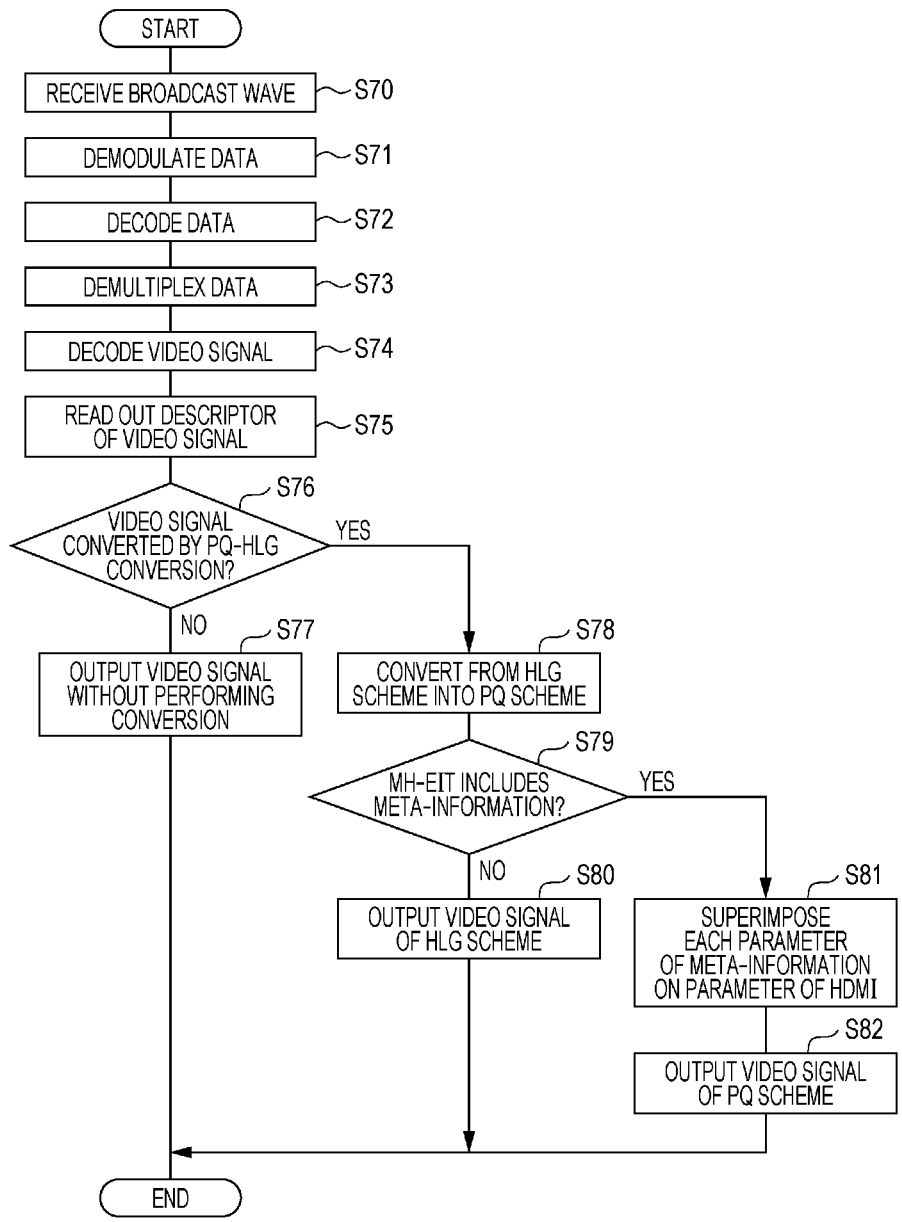
FIG. 15 is a flowchart that explains a video signal conversion method of the video signal conversion device 20 according to a third embodiment of the present invention.

The video signal conversion method executed by the video signal conversion device 20 according to this embodiment will be described with reference to FIG. 15. FIG. 15 is a flowchart that illustrates the video signal conversion method executed by the video signal conversion device 20 according to this embodiment.

First, the reception unit 21 receives the encrypted data in the MMT format (the encrypted MMT format data), which are output by the video signal conversion device 1 (step S70). Next, the demodulation unit 23 demodulates the encrypted MMT format data, which are received by the reception unit 21 (step S71). Next, the encryption decoding unit 24 decodes the encrypted MMT format data, which are demodulated by the demodulation unit 23 (step S72).

Next, the demultiplexing unit 25 demultiplexes the MMT format data decoded by the encryption decoding unit 24 into the HDR video signal following the second video format, the audio signal that corresponds to the video signal, and the MH-EIT that includes the meta-information related to the HDR video signal following the first video format (step S73).

Next, the video signal decoding unit 26 decodes the HDR video signal following the second video format, which is separated by demultiplexing by the demultiplexing unit 25 (step S74).

Next, the read-out unit 29 reads out the descriptor, which indicates that the HDR video signal following the first video format is converted into the HDR video signal following the second video format, from the MPT that accompanies the HDR video signal following the second video format, which is decoded by the video signal decoding unit 26 (step S75).

Next, the read-out unit 29 refers to the descriptor that is read out and thereby assesses whether or not the HDR video signal following the second video format is the HDR video signal that is converted from the HDR video signal following the first video format (step S76).

In a case where the read-out unit 29 assesses that the HDR video signal following the second video format is not the HDR video signal that is converted from the HDR video signal following the first video format (NO in step S76), the video signal conversion unit 30 outputs the HDR video signal following the second video format to the display control unit 31 without processing the HDR video signal following the second video format (step S77).

In a case where the read-out unit 29 assesses that the HDR video signal following the second video format is the HDR video signal that is converted from the HDR video signal following the first video format (YES in step S76), the video signal conversion unit 30 converts the HDR video signal following the second video format into the HDR video signal following the first video format (step S78).

Next, the meta-information read-out unit 28 assesses whether or not the meta-information related to the HDR video signal following the first video format is included in the MH-EIT, which is separated by demultiplexing by the demultiplexing unit 25 (step S79).

In a case where the meta-information read-out unit 28 assesses that the meta-information is not included in the MH-EIT (NO in step S79), the video signal conversion unit 30 outputs the HDR video signal following the second video format (step S80).

In a case where the meta-information read-out unit 28 assesses that the meta-information is included in the MH-EIT (YES in step S79), the video signal conversion unit 30 superimposes the parameter indicated by the meta-information read out by the meta-information read-out unit 28 on Info Frame of HDMI® (step S81).

Next, the video signal conversion unit 30 outputs the converted HDR video signal following the first video format together with Info Frame of HDMI® on which the meta-information is superimposed to the display control unit 31 (step S82).

As described in the above, the video signal conversion device 20 according to this embodiment outputs the HDR video signal following the first video format together with the meta-information in a case where the HDR video signal following the second video format accompanies the meta-information and outputs the HDR video signal following the second video format in a case where the HDR video signal following the second video format does not accompany the meta-information. Accordingly, the HDR video signal to be output may be decided in accordance with presence or absence of the meta-information.

[Examples of Realization by Software]

Control blocks (particularly, the video signal acquisition unit 3, the audio signal acquisition unit 4, the video signal conversion unit 5, the video signal coding unit 6, the generation unit 7, the audio signal coding unit 8, the multiplexing unit 9, the addition unit 10, the encryption unit 11, and the output unit 12 of the processing unit 2 and the transmission unit 13) of the video signal conversion devices 1 and 40 and control blocks (particularly, the demodulation unit 23, the encryption decoding unit 24, the demultiplexing unit 25, the video signal decoding unit 26, the audio signal decoding unit 27, the meta-information read-out unit 28, the read-out unit 29, and the video signal conversion unit 30 of the processing unit 22 and the meta-information acquisition unit 53 of the processing unit 52) of the video signal conversion devices 20 and 50 may be realized by logic circuits (hardware) that are formed on an integrated circuit (IC chip) or the like or may be realized by software by using a central processing unit (CPU).

In the latter case, the video signal conversion devices 1 and 40 and the video signal conversion devices 20 and 50 include a CPU that executes orders of a program, which is software for realizing functions, a read only memory (ROM) or a storage device (which will be referred to as "recording medium") in which the program and various data are recorded such that those are readable by a computer (or a CPU), a random access memory (RAM) on which the program is expanded, and so forth. Further, the computer (or the CPU) reads out the program from the recording medium and executes the program, and an object of the present invention is thereby achieved. As the recoding medium, "non-transitory tangible medium", for example, a tape, a disk, a card, a semiconductor memory, a programmable logic circuit, or the like may be used. Further, the program may be supplied to the computer via an arbitrary transmission medium that is capable of transmitting the program (such as a communication network or a broadcast wave). Note that the present invention may be realized by a mode of data signals embedded in a carrier, in which the program is shaped by electronic transmission.

CONCLUSION

A video signal conversion device (1 or 40) according to a first aspect of the present invention includes: a conversion unit (5) that converts a high dynamic range video signal following a first video format into a high dynamic range video signal following a second video format; and an output unit (12) that outputs supplementary information which is related to the high dynamic range video signal following the first video format.

In the above configuration, even in a case where the HDR video signal following the first video format is converted into the HDR video signal following the second video format, the supplementary information related to the HDR video signal following the original first video format is not lost.

As for the video signal conversion device (1 or 40) according to a second aspect of the present invention, in the first aspect, a luminance scheme of the first video format may be an absolute luminance scheme, and a luminance scheme of the second video format may be a relative luminance scheme.

In the above configuration, the video signal conversion device according to the first aspect may preferably be used.

In the first or second aspect, the video signal conversion device (1 or 40) according to a third aspect of the present invention may further include an addition unit (10) that adds a descriptor, which indicates that the high dynamic range video signal following the first video format is converted into the high dynamic range video signal following the second video format, as the supplementary information to the high dynamic range video signal following the second video format.

In the above configuration, on the side of the receiver that receives the HDR video signal which accompanies the descriptor indicating that conversion is performed between different video formats, the descriptor is read, and which video format is followed by the HDR video signal from which the HDR video signal is converted may thereby be recognized.

As for the video signal conversion device (1 or 40) according to a fourth aspect of the present invention, in the first to third aspects, the supplementary information may include meta-information, and the meta-information may include at least one or more of a maximum luminance value, a minimum luminance value, an average luminance value, a white level, and information related to a master monitor in the high dynamic range video signal following the first video format.

In the above configuration, on the receiver side on which the meta-information is received, the HDR video signal may preferably be converted.

As for the video signal conversion device (1) according to a fifth aspect of the present invention, in the first to fourth aspects, the output unit may output the supplementary information while superimposing the supplementary information on the high dynamic range video signal following the second video format, which is converted by the conversion unit, and the video signal conversion device may further include a transmission unit (13) that transmits the high dynamic range video signal following the second video format, which the output unit outputs while superimposing the supplementary information.

In the above configuration, because the high dynamic range video signal following the second video format may be transmitted together with the supplementary information, no other transmission path is requested.

In the first to fourth aspects, the video signal conversion device (40) according to a sixth aspect of the present invention may further include a communication unit (41) that transmits the supplementary information which is output by the output unit through a different transmission path from a transmission path for transmitting the high dynamic range video signal following the second video format.

In the above configuration, because the supplementary information is transmitted through the transmission path that does not accompany the high dynamic range video signal following the second video format, the information amount of the supplementary information to be transmitted may be increased.

A video signal conversion device (20 or 50) according to a seventh aspect of the present invention includes: an acquisition unit (28 or 53) that acquires supplementary information which is related to a high dynamic range video signal following a first video format; and a conversion unit (30) that converts a high dynamic range video signal following a second video format, which is converted from the high dynamic range video signal following the first video format, into the high dynamic range video signal following the first video format by referring to the supplementary information.

In the above configuration, even in a case where the HDR video signal following the second video format, which is converted from the HDR video signal following the first video format, is converted into the HDR video signal following the original first video format, the image quality of the HDR video signal following the original first video format may be maintained.

As for the video signal conversion device (20 or 50) according to an eighth aspect of the present invention, in the seventh aspect, a luminance scheme of the first video format may be an absolute luminance scheme, and a luminance scheme of the second video format may be a relative luminance scheme.

In the above configuration, the video signal conversion device according to the eighth aspect may preferably be used.

In the seventh or eighth aspect, the video signal conversion device (20 or 50) according to a ninth aspect of the present invention may further include a read-out unit (29) that reads out a descriptor, which indicates that the high dynamic range video signal following the first video format is converted into the high dynamic range video signal following the second video format, from the high dynamic range video signal following the second video format.

In the above configuration, which video format is followed by the HDR video signal from which the HDR video signal is converted may be recognized.

As for the video signal conversion device (20 or 50) according to a tenth aspect of the present invention, in the ninth aspect, only in a case where the read-out unit reads out the descriptor, which indicates conversion from the high dynamic range video signal following the first video format, from the high dynamic range video signal following the second video format, the conversion unit may convert the high dynamic range video signal following the second video format into the high dynamic range video signal following the first video format by referring to the supplementary information.

In the above configuration, only the high dynamic range video signal following the second video format, which is converted from the high dynamic range video signal following the first video format, may be converted into the high dynamic range video signal following the original first video format.

As for the video signal conversion device (20 or 50) according to an eleventh aspect of the present invention, in the tenth aspect, the supplementary information may include meta-information, and the meta-information may include at least one or more of a maximum luminance value, a minimum luminance value, an average luminance value, a white level, and information related to a master monitor in the high dynamic range video signal following the first video format.

In the above configuration, the HDR video signal may preferably be converted by referring to the acquired meta-information.

In the seventh to eleventh aspects, the video signal conversion device (20) according to a twelfth aspect of the present invention may further include a meta-information read-out unit (28) that reads out the supplementary information which is superimposed on the high dynamic range video signal following the second video format.

In the above configuration, because the high dynamic range video signal following the second video format may be acquired together with the supplementary information, the supplementary information does not have to be acquired from another transmission path.

In the seventh to eleventh aspects, the video signal conversion device (50) according to a thirteenth aspect of the present invention may further include a communication unit (51) that receives the supplementary information which is transmitted through a different transmission path from a transmission path for transmitting the high dynamic range video signal following the second video format.

In the above configuration, because the supplementary information is received through the transmission path that does not accompany the high dynamic range video signal following the second video format, the information amount of the supplementary information to be received may be increased.

A television image receiver (100) according to a fourteenth aspect of the present invention includes the video signal conversion device according to any one of the seventh to thirteenth aspects.

In the above configuration, similar effects to the video signal conversion device according to any one of the seventh to eleventh aspects may be provided.

A video signal conversion method according to a fifteenth aspect of the present invention includes: a conversion process of converting a high dynamic range video signal following a first video format into a high dynamic range video signal following a second video format; and an outputting process of outputting supplementary information which is related to the high dynamic range video signal following the first video format.

In the above configuration, similar effects to the video signal conversion device according to the first aspect may be provided.

A video signal conversion method according to a sixteenth aspect of the present invention includes: an acquisition process of acquiring supplementary information which is related to a high dynamic range video signal following a first video format; and a conversion process of converting a high dynamic range video signal following a second video format, which is converted from the high dynamic range video signal following the first video format, into the high dynamic range video signal following the first video format by referring to the supplementary information.

In the above configuration, similar effects to the video signal conversion device according to the seventh aspect may be provided.

A video signal conversion system according to a seventeenth aspect of the present invention includes: a first video signal conversion device (1 or 40) including a conversion unit (5) that converts a high dynamic range video signal following a first video format into a high dynamic range video signal following a second video format, and an output unit (12) that outputs supplementary information which is related to the high dynamic range video signal following the first video format; and a second video signal conversion device (20 or 50) including an acquisition unit (28 or 53) that acquires the supplementary information, which is related to the high dynamic range video signal following the first video format, from the first video signal conversion device, and a conversion unit (30) that converts the high dynamic range video signal following the second video format, which is converted by the first video signal conversion device, into the high dynamic range video signal following the first video format by referring to the supplementary information.

In the above configuration, even in a case where the HDR video signal following the first video format is converted into the HDR video signal following the second video format on the transmitter side, the supplementary information related to the HDR video signal following the original first video format is not lost. Further, even in a case where the HDR video signal following the second video format, which is converted from the HDR video signal following the first video format, is converted into the HDR video signal following the original first video format on the receiver side, the image quality of the HDR video signal following the original first video format may be maintained.

The video signal conversion devices according to the aspects of the present invention may be realized by a computer. In this case, a control program of the video signal conversion device that causes the computer to act as each unit (software element) included in the video signal conversion device and thereby realizes the video signal conversion device with the computer and a computer-readable recording medium that records the control program are included in the purview of the present invention.

The present invention is not limited to the above-described embodiments. Various kinds of alternations are possible in the scope described in claims, and embodiments that are obtained by appropriately combining technical measures disclosed in the different embodiments are included in the technical scope of the present invention. In addition, new technical features may be formed by combining technical measures that are disclosed in the embodiments.

REFERENCE SIGNS LIST 1, 20, 40, 50 video signal conversion device
2, 22, 52 processing unit
3 video signal acquisition unit
4 audio signal acquisition unit
5, 30 video signal conversion unit
6 video signal coding unit
7 generation unit
8 audio signal coding unit
9 multiplexing unit
10 addition unit
11 encryption unit
12 output unit
13 transmission unit
21 reception unit
23 demodulation unit
24 encryption decoding unit
25 demultiplexing unit
26 video signal decoding unit
27 audio signal decoding unit
28 meta-information read-out unit
29 read-out unit
31 display control unit 41, 51 communication unit
53 meta-information acquisition unit
100 television image receiver

The invention claimed is:

1. A video signal conversion device comprising:
   a conversion unit that converts a video signal following a first video format into a video signal following a second video format; and
   an output unit that outputs supplementary information which is related to the video signal following the first video format, wherein
   a luminance scheme of the first video format is an absolute luminance scheme, and
   a luminance scheme of the second video format is a relative luminance scheme.

2. The video signal conversion device according to claim 1, further comprising:
   an addition unit that adds a descriptor, which indicates that a high dynamic range video signal following the first video format is converted into the high dynamic range video signal following the second video format, as the supplementary information to the high dynamic range video signal following the second video format.

3. The video signal conversion device according to claim 1, wherein the supplementary information includes meta-information, and the meta-information includes at least one or more of a maximum luminance value, a minimum luminance value, an average luminance value, a white level, and information related to a master monitor in a high dynamic range video signal following the first video format.

4. The video signal conversion device according to claim 1, wherein
   the output unit outputs the supplementary information while superimposing the supplementary information on a high dynamic range video signal following the second video format, which is converted by the conversion unit, and
   the video signal conversion device further includes a transmission unit that transmits the high dynamic range video signal following the second video format, which the output unit outputs while superimposing the supplementary information.

5. The video signal conversion device according to claim 1, further comprising:
   a communication unit that transmits the supplementary information which is output by the output unit through a different transmission path from a transmission path for transmitting a high dynamic range video signal following the second video format.

6. A non-transitory computer-readable recording medium that records the control program that causes a computer to function as the video signal conversion device according to claim 1.

7. The video signal conversion device according to claim 1, wherein
   the video signal is a high dynamic range video signal.

8. A video signal conversion device comprising:
   an acquisition unit that acquires supplementary information which is related to a video signal following a first video format; and
   a conversion unit that converts a video signal following a second video format, which is converted from the video signal following the first video format, into the video signal following the first video format by referring to the supplementary information, wherein
   a luminance scheme of the first video format is an absolute luminance scheme, and
   a luminance scheme of the second video format is a relative luminance scheme.

9. The video signal conversion device according to claim 8, further comprising:
   a read-out unit that reads out a descriptor, which indicates that a high dynamic range video signal following the first video format is converted into the high dynamic range video signal following the second video format, from the high dynamic range video signal following the second video format.

10. The video signal conversion device according to claim 9, wherein only in a case where the read-out unit reads out the descriptor, which indicates conversion from the high dynamic range video signal following the first video format, from the high dynamic range video signal following the second video format, the conversion unit converts the high dynamic range video signal following the second video format into the high dynamic range video signal following the first video format by referring to the supplementary information.

11. The video signal conversion device according to claim 8, wherein the supplementary information includes meta-information, and the meta-information includes at least one or more of a maximum luminance value, a minimum luminance value, an average luminance value, a white level, and information related to a master monitor in a high dynamic range video signal following the first video format.

12. The video signal conversion device according to claim 8, further comprising:
    a meta-information read-out unit that reads out the supplementary information which is superimposed on a high dynamic range video signal following the second video format.

13. The video signal conversion device according to claim 8, further comprising:
    a communication unit that receives the supplementary information which is transmitted through a different transmission path from a transmission path for transmitting a high dynamic range video signal following the second video format.

14. A television image receiver comprising:
    the video signal conversion device according to claim 8.

15. A non-transitory computer-readable recording medium that records the control program that causes a computer to function as the video signal conversion device according to claim 8.

16. The video signal conversion device according to claim 8, wherein
    the video signal is a high dynamic range video signal.

17. A video signal conversion method comprising:
    a conversion process of converting a video signal following a first video format into a video signal following a second video format; and
    an outputting process of outputting supplementary information that is related to the video signal following the first video format, wherein
    a luminance scheme of the first video format is an absolute luminance scheme, and
    a luminance scheme of the second video format is a relative luminance scheme.

18. A video signal conversion method comprising:
    an acquisition process of acquiring supplementary information which is related to a video signal following a first video format; and
    a conversion process of converting a video signal following a second video format, which is converted from the video signal following the first video format, into the video signal following the first video format by referring to the supplementary information, wherein
a luminance scheme of the first video format is an absolute luminance scheme, and
a luminance scheme of the second video format is a relative luminance scheme.

19. A video signal conversion system comprising:
a first video signal conversion device including
  a conversion unit that converts a video signal following a first video format into a video signal following a second video format, and
  an output unit that outputs supplementary information which is related to the video signal following the first video format; and
a second video signal conversion device including
  an acquisition unit that acquires the supplementary information, which is related to the video signal following the first video format, from the first video signal conversion device, and
  a conversion unit that converts the video signal following the second video format, which is converted by the first video signal conversion device, into the video signal following the first video format by referring to the supplementary information, wherein
a luminance scheme of the first video format is an absolute luminance scheme, and
a luminance scheme of the second video format is a relative luminance scheme.

* * * * *